(12) United States Patent
White et al.

(10) Patent No.: US 11,274,192 B2
(45) Date of Patent: Mar. 15, 2022

(54) POLYAMIDE COMPOSITIONS AND PLATING APPLICATIONS THEREOF

(71) Applicant: Ascend Performance Materials Operations LLC, Houston, TX (US)

(72) Inventors: Kimberly M. White, Pensacola, FL (US); Scott E. Powers, Rockford, MI (US); Jacob G. Ray, Pace, FL (US); Bradley J. Sparks, Pace, FL (US)

(73) Assignee: Ascend Performance Materials Operations LLC, Houston, TX (US)

( * ) Notice: Subject to any disclaimer, the term of this patent is extended or adjusted under 35 U.S.C. 154(b) by 258 days.

(21) Appl. No.: 16/455,268

(22) Filed: Jun. 27, 2019

(65) Prior Publication Data

US 2020/0002511 A1    Jan. 2, 2020

Related U.S. Application Data

(60) Provisional application No. 62/690,755, filed on Jun. 27, 2018.

(51) Int. Cl.

| | |
|---|---|
| *C08K 13/02* | (2006.01) |
| *B29C 45/00* | (2006.01) |
| *B29C 45/72* | (2006.01) |
| *C08G 69/26* | (2006.01) |
| *C08G 69/36* | (2006.01) |
| *C08K 3/22* | (2006.01) |
| *C08K 3/40* | (2006.01) |
| *C08K 5/098* | (2006.01) |
| *C08K 5/3435* | (2006.01) |
| *C08K 7/14* | (2006.01) |
| *C08K 9/06* | (2006.01) |
| *C23C 18/16* | (2006.01) |
| *C23C 18/22* | (2006.01) |
| *C23C 18/31* | (2006.01) |
| *C25D 5/54* | (2006.01) |
| *B29K 77/00* | (2006.01) |
| *B29K 105/12* | (2006.01) |
| *B29K 509/08* | (2006.01) |

(52) U.S. Cl.
CPC .......... *C08K 13/02* (2013.01); *B29C 45/0001* (2013.01); *B29C 45/72* (2013.01); *C08G 69/265* (2013.01); *C08G 69/36* (2013.01); *C08K 3/22* (2013.01); *C08K 3/40* (2013.01); *C08K 5/098* (2013.01); *C08K 5/3435* (2013.01); *C08K 7/14* (2013.01); *C08K 9/06* (2013.01); *C23C 18/1641* (2013.01); *C23C 18/22* (2013.01); *C23C 18/31* (2013.01); *C25D 5/54* (2013.01); *B29K 2077/00* (2013.01); *B29K 2105/122* (2013.01); *B29K 2509/08* (2013.01); *C08K 2003/2224* (2013.01); *C08K 2201/003* (2013.01); *C08K 2201/014* (2013.01)

(58) Field of Classification Search
None
See application file for complete search history.

(56) References Cited

U.S. PATENT DOCUMENTS

| | | | |
|---|---|---|---|
| 2004/0102559 A1 | 5/2004 | Oyamada et al. | |
| 2014/0094548 A1* | 4/2014 | Roth | C08K 5/0041 524/159 |
| 2015/0232664 A1 | 8/2015 | Guo et al. | |
| 2017/0166746 A1* | 6/2017 | Maeda | C08L 77/06 |
| 2017/0335106 A1* | 11/2017 | Jung | C08L 77/06 |
| 2018/0244919 A1* | 8/2018 | Kim | C08K 3/36 |
| 2019/0055402 A1* | 2/2019 | I | C08K 7/10 |
| 2020/0157699 A1* | 5/2020 | Wagner | C23C 18/1641 |

FOREIGN PATENT DOCUMENTS

| | | | |
|---|---|---|---|
| CN | 105238040 | | 1/2016 |
| EP | 2 042 556 | * | 7/2006 |
| WO | 2017034295 | | 3/2017 |

OTHER PUBLICATIONS

International Application No. PCT/US2019/039501, "International Search Report and Written Opinion", dated Oct. 7, 2019, 12 pages.

\* cited by examiner

*Primary Examiner* — Robert T Butcher
(74) *Attorney, Agent, or Firm* — Cozen O'connor

(57) ABSTRACT

The present disclosure relates to polyamide compositions and resulting injection-molded articles that can be plated, e.g., metal coated, to form structurally aesthetic injection-molded articles. The polyamide compositions may include from 40 wt. % to 80 wt. % of a polyamide, from 0.5 wt. % to 40 wt. % of an etchable filler, from 5 wt. % to 30 wt. % of glass fiber, optionally less than 40 wt. % of a semi-structural mineral, and optionally from 0.1 wt. % to 13 wt. % of additive. The polyamide composition imparts very good surface appearance and excellent mechanical properties to injection-molded articles that are substantially free of visual defects.

16 Claims, No Drawings

POLYAMIDE COMPOSITIONS AND PLATING APPLICATIONS THEREOF

CROSS-REFERENCE TO RELATED APPLICATION

This application claims the benefit of and the priority to U.S. Provisional Application No. 62/690,755, filed on Jun. 27, 2018, which is hereby incorporated by reference in its entirety for all purposes.

FIELD

The present disclosure generally relates to polyamide compositions. In particular, the present disclosure relates to (reinforced) polyamide compositions for metal-plated injection-molded articles exhibiting a very good surface appearance, e.g., smoothness and distinctness of image, and excellent mechanical properties.

BACKGROUND

Polyamide compositions are used in various applications because of their excellent mechanical properties. In particular, polyamide compositions including reinforcement fillers remarkably improve the strength and rigidity of injection-molded articles. For example, polyamide compositions may comprise reinforcement fillers, e.g., glass fibers, to improve mechanical properties or to reduce the costs of the material. The use of high glass loadings in thermoplastic materials tends to increase stiffness, e.g., tensile and flexural modulus, and strength, e.g., tensile and flexural strength of the reinforced plastic. Glass fibers, however, have a negative effect on the surface quality and aesthetics of injection-molded articles.

Particulate fillers are often added to polyamide compositions in order to achieve a desired surface appearance for injection-molded articles. Adding particulate filler materials to glass fiber reinforced polyamide compositions, however, significantly impairs mechanical characteristics, in particular reducing tensile strength, ultimate elongation, and impact resistance. This results in a composition wherein little or no particulate filler material is allowed to bind the glass fibers and the tensile strength and impact resistance of the molded part is reduced. On one hand, the addition of particulate filler material to glass fiber reinforced injection-molded articles results in the desired pigmentation or functionality, yet on the other hand, it leads to deterioration in terms of mechanical characteristics, e.g., tensile strength and impact resistance.

Furthermore, if glass fibers and/or particulate fillers are present in large amounts, the surface appearance of the articles may become unsatisfactory, e.g., from an aesthetic perspective. In many applications, it is necessary for the polyamide compositions to form injection-molded articles having desired surface qualities, e.g., shine or reflectivity. For example, parts for the automotive sector require injection-molded articles with metal-like properties which are achieved through highly filled reinforced molding compounds. But, after molding, the glass fibers and/or particulate fillers on the exterior surface of the article produce a dull or matted finish, and these fibers interfere with the adhesion of a subsequent painting or plating application that otherwise would cover the fibers. In the case of parts with thin walls, a high flow length of the molding compounds is necessary, but this cannot be achieved at all or can only be achieved poorly when using glass fibers.

Other types of filled or reinforced plastic materials suffer from similar problems. Traditional "high modulus" materials contain glass, or mica, or other fillers that are capable of increasing the modulus, or stiffness, of the material. Examples include glass filled polybutylene terephthalate (PBT), polyamide (PA), acrylonitrile butadiene styrene (ABS), polycarbonate/acrylonitrile butadiene styrene (PC/ABS), polypropylene (PP), etc. The addition of fillers, however, also has an adverse effect on the surface quality of the part. Therefore, these types of materials are molded in low gloss, textured applications. These parts can also be painted, but a primer is typically needed to cover the surface imperfections prior to the top-coat paint layer. Because of the problems associated with the fillers, "aesthetic" materials are typically unfilled amorphous resins that can be easily molded-in-color, painted or metal plated. These materials include unfilled PBT, PA, ABS, PC/ABS, PP, polyphenylene oxide (PPO), etc. Unfortunately, these materials do not provide the structural strength necessary for many metal replacement applications.

There is still a growing demand for polyamides which could provide better mechanical properties, reduced equipment wear, in addition to excellent surface appearance with the possibility of more complex designs, and enable improvements in productivity, cost saving and alternative designs.

SUMMARY

According to one embodiment, the present disclosure relates to a polyamide composition comprising: from 40 wt. % to 80 wt. % of a polyamide; from 0.5 wt. % to 40 wt. % of an etchable filler; from 5 wt. % to 30 wt. % of glass fibers having an average diameter up to 10 microns; less than 40 wt. % of a semi-structural mineral; and from 0.1 wt. % to 13 wt. % of additive. In some embodiments, the polyamide comprises PA-6, PA-6,6, PA4,6, PA-6,9, PA-6,10, PA-6,12, PA11, PA12, PA9,10, PA9,12, PA9,13, PA9,14, PA9,15, PA-6,16, PA9,36, PA10,10, PA10,12, PA10,13, PA10,14, PA12,10, PA12,12, PA12,13, PA12,14, PA-6,14, PA-6,13, PA-6,15, PA-6,16, PA-6,13, PAMXD,6, PA4T, PA5T, PA-6T, PA9T, PA10T, PA12T, PA4I, PA5I, PA-6I, PA10I, copolymers, terpolymers, and mixtures thereof. In some embodiments, the polyamide is a copolymer comprising PA-6,6 and PA-6I, wherein the PA-6I ranges from 2 wt. % to 20 wt. %. In some embodiments, the polyamide is a terpolymer comprising PA-6,6, PA-6, and PA-6I, wherein the terpolymer comprises PA-6I ranging from 2 wt. % to 20 wt. % and PA-6 ranging from 2 wt. % to 20 wt. %. In some embodiments, the additive includes at least one of: inorganic stabilizers, organic stabilizers, flame retardants, lubricants, dyes, pigments, nucleating agents, metal flakes, impact modifiers, antistatic agents, conductivity additives, mold-release agents, optical brighteners, adhesion promoters, ageing inhibitors, antioxidants, antiozonants, light stabilizers, UV stabilizers, UV absorbers, UV blockers, inorganic heat stabilizers, organic heat stabilizers, processing aids, crystallization accelerators, crystallization retarders, flow aids, fibrous materials and particulate fillers. In some embodiments, the additive comprises from 1 wt. % to 10 wt. % of pigment, from 0.05 wt. % to 1 wt. % of lubricant, and/or from 0.25 wt. % to 2 wt. % of processing aid, wherein the pigment comprises a thermally stable nigrosine, wherein the lubricant comprises zinc stearate, and wherein the processing aid comprises a substituted piperidine compound. In some embodiments, the polyamide composition includes from 0.5 wt. % to 25 wt. % of the etchable filler, and the etchable filler is coated with one or more of an organosilane coating, a vinylsilane coating, or an aminosilane coating. In some embodiments, the etchable filler comprises one or more of magnesium hydroxide, calcium carbonate, and wollastonite. In some embodiments, the glass fibers have an average diameter ranging from 4 microns to 8 microns. In some embodiments, the composition comprises a semi-structural mineral, wherein the semi-structural mineral comprises one or more of kaolin, mica, talc, and wollanstonite. In some embodiments, the composition has a distinctness of image greater than 50 as measured by Byk Gardner Wave Scan meter, and wherein the composition has a R-value greater than 5 as measured by Byk Gardner Wave Scan meter. In some embodiments, the composition has a density ranging from 1.25 $g/cm^3$ to 1.6 $g/cm^3$, and wherein the composition has a melting point ranging from 220° C. to 260° C. In some embodiments, the polyamide is a copolymer comprising PA-6,6 and PA-6I, wherein the composition includes glass fibers having an average diameter ranging from 4 microns to 8 microns, wherein the composition has a density ranging from 1.3 $g/cm^3$ to 1.6 $g/cm^3$, wherein the composition has a distinctness of image greater than 65 as measured by Byk Gardner Wave Scan meter, wherein the composition has a R-value greater than 7 as measured by Byk Gardner Wave Scan meter. In some embodiments, the polyamide is a terpolymer comprising PA-6,6, PA-6I, and PA-6, wherein the composition includes glass fibers having an average diameter ranging from 4 microns to 8 microns, wherein the composition has a density ranging from 1.3 $g/cm^3$ to 1.6 $g/cm^3$, wherein the composition has a distinctness of image greater than 65 as measured by Byk Gardner Wave Scan meter, wherein the composition has a R-value greater than 7 as measured by Byk Gardner Wave Scan meter. In some embodiments, an injection-molded article formed from the composition described herein, wherein the injection-molded article is plated with a metal comprising one or more of copper, manganese, tin, nickel, iron, chrome, zinc, gold, platinum, cobalt, phosphorus, aluminum, and alloys thereof.

In some embodiments, the present disclosure is related to a polyamide composition comprising: from 40 wt. % to 80 wt. % of a polyamide; from 0.5 wt. % to 40 wt. % of a silane-coated magnesium hydroxide; from 5 wt. % to 30 wt. % of glass fiber having an average diameter up to 10 microns; less than 40 wt. % of kaolin; and from 0.1 wt. % to 13 wt. % of additive. In some embodiments, the additive comprises from 0.5 wt. % to 10 wt. % of thermally stable nigrosine, from 0.05 wt. % to 1 wt. % of zinc stearate, and/or from 0.25 wt. % to 2 wt. % of substituted piperidine compound.

In some embodiments, the present disclosure is related to a process for preparing an injection-molded article comprising: providing a polyamide composition comprising: from 40 wt. % to 80 wt. % of a polyamide; from 0.5 wt. % to 40 wt. % of an etchable filler; from 5 wt. % to 30 wt. % of glass fiber, wherein the glass fibers have an average diameter up to 10 microns; less than 40 wt. % of a semi-structural mineral; and from 0.1 wt. % to 13 wt. % of additive; heating the polyamide composition; filling a mold cavity with the heated polyamide composition; cooling the heated polyamide composition to form the injection-molded article. In some embodiments, the process further comprises etching a surface of the injection-molded article with an etching solution, wherein the etching solution does not comprise any hexavalent chromium. In some embodiments, the process further comprises plating the etched surface of the injection-molded article with a metal comprising one or more of copper, manganese, tin, nickel, iron, chrome, zinc, gold, platinum, cobalt, phosphorus, aluminum, and alloys thereof.

DETAILED DESCRIPTION

Introduction

In general, the present disclosure relates to polyamide compositions and injection-molded articles produced therefrom that can be plated, e.g., metal coated, to form injection-molded articles having desirable structural and aesthetic properties. In some embodiments, the polyamide composition comprises from 40 wt. % to 80 wt. % of a polyamide, from 0.5 wt. % to 40 wt. % of an etchable filler, from 5 wt. % to 30 wt. % of glass fiber, optionally less than 40 wt. % of a semi-structural mineral, and optionally from 0.1 wt. % to 13 wt. % of additive. The polyamide composition includes a specific combination of polyamides, glass fibers, etchable fillers, semi-structural minerals (optionally), and additives (optionally) that have been found to impart a synergistic combination of very good surface appearance and excellent mechanical properties to injection-molded articles. Additionally, the resulting injection-molded article can be plated to form an article that is substantially free of visual defects on the surface and that has high peel strength. The polyamide composition is beneficially useful in structural applications where both the mechanical properties and surface appearance of an injection-molded article are important.

As discussed above, conventional polymer compositions for injection molding applications cannot achieve good surface appearance qualities while maintaining desirable mechanical properties. For example, conventional polymer compositions add glass fibers in high concentrations to improve mechanical properties, e.g., peel strength, density, and stiffness, of the resulting molding product. Polyamide compositions having glass fibers, however, suffer from surface appearance defects. For example, the resulting injection-molded products will have poor appearance due to emergence of the glass fiber on the molded article surface.

Additionally, other types of filled or reinforced plastic materials suffer from similar problems. Traditional "high modulus" materials contain glass, or mica, or other fillers that are capable of increasing the modulus, or stiffness, of the material. However, the addition of fillers also has an adverse effect on the surface quality of the molded article. As such, these types of materials are molded in low gloss, textured (non-aesthetic) applications. As noted above, aesthetic materials are typically unfilled, amorphous resins that can be easily molded-in-color, painted or metal plated. Again, however, these materials do not provide the structural strength necessary for many metal replacement applications.

It has now been surprisingly and unexpectedly found that polyamide compositions having specific amounts of polyamide, glass fibers, surface-treated etchable fillers, optional minerals, and optional additives, form reinforced injection-molding articles that demonstrate both improved aesthetic and mechanical properties. The synergistic combination of components of the polyamide composition improve the surface appearance of injection-molded articles, while providing structural integrity to the resulting injection-molded article. Further, by utilizing glass fibers having a specific diameter and/or length, the polyamide composition surprisingly exhibits good surface appearance at high glass loadings, as compared to conventional reinforced polyamide compositions. It has been found that polyamide compositions including the aforementioned components, improve surface appearance as characterized by the orange peel Rating (R-value), distinctness of image (DOI), longwave, and shortwave of injection-molded articles.

The polyamide compositions disclosed herein provide both structural and aesthetic properties. In some cases, these compositions can effectively replace conventional ABS and PC/ABS injection-molded articles which have no structural integrity (purely decorative). Additionally, conventional ABS and PC/ABS have low heat absorption temperature (HDT) and cannot tolerate high temperature paint coating, which makes it difficult to apply an aesthetic coating. Beneficially, the polyamide composition has a high HDT and does not form blisters during high temperature paint coating, which provides for additional production options.

The specific combination of the copolymers, e.g., PA-6,6/6I, and/or terpolymers, e.g., PA-6,6/6I/6, in the polyamide composition has been shown to enhance the surface appearance of injection-molded articles. It has been found that using the specific polyamides increases the melting point of the polyamide (to within a relatively high range). Beneficially, the higher melting point of the polyamides prevents etch-induced blistering and also reduces scrap rate compared to conventional polyamide compositions. By utilizing the specific polyamides, e.g., copolymers and terpolymers described herein, the processing time and temperature range for injection molding applications has also been beneficially expanded.

The polyamide compositions described herein also produce an injection-molded article that is capable of being strongly bonded to a plating, e.g., chrome-plating. In particular, the polyamide composition employs a surface-treated etchable filler that produces a platable injection-molded article with a significantly higher peel strength contributing to the durability of the molding product while achieving good surface aesthetics. For example, the polyamide composition includes a surface-treated etchable filler that improves the etching properties of the resultant injection-molded articles. The improved etching properties provides high peel strengths between the interface of the surface of the injection-molded article and the metal plating.

It has also been found that providing some additives, optionally in specific quantities, beneficially improves surface appearance, structural properties, and processability of the injection-molded article formed from the polyamide composition. The additives may be, for example, specific pigments, lubricants, and/or processing aids. In some aspects, the polyamide composition comprises from 1 wt. % to 10 wt. % of pigment, from 0.05 wt. % to 1 wt. % of lubricant, and/or from 0.25 wt. % to 2 wt. % of processing aid. The synergistic combinations of performance characteristics are discussed in more detail herein.

Polyamides

The polyamide composition may include a wide variety of polyamides. In some embodiments, the polyamide may comprise PA-6, PA-6,6, PA4,6, PA-6,9, PA-6,10, PA-6,12, PA11, PA12, PA9,10, PA9,12, PA9,13, PA9,14, PA9,15, PA-6,16, PA9,36, PA10,10, PA10,12, PA10,13, PA10,14, PA12,10, PA12,12, PA12,13, PA12,14, PA-6,14, PA-6,13, PA-6,15, PA-6,16, PA-6,13, PAMXD,6, PA4T, PA5T, PA-6T, PA9T, PA10T, PA12T, PA4I, PA5I, PA-6I, PA10I, copolymers, terpolymers, and mixtures thereof.

In some embodiments, the polyamide compositions may comprise one or more polyamides, e.g., a copolymer and/or a terpolymer. It has been found that using copolymers or terpolymers not only enhances the surface appearance of injection-molded articles, but also increases the melting point of the resultant injection-molded article. By utilizing the copolymers or terpolymers in the polyamide composition, the resultant injection-molded article achieves desirable mechanical properties and surface appearance. For example, in some embodiments, the polyamide composition comprises copolymers or terpolymers of PA-6, PA-6,6, and PA-6I. In some aspects, the polyamide composition includes one or more of PA-6,6/6, PA-6,6/6I and PA-6,6/6/I.

In some embodiments, the polyamide composition may comprise a copolymer of PA-6,6/6I. In some embodiments, the copolymer of PA-6,6/6I comprises PA-6I in an amount ranging from 1 wt. % to 20 wt. %, e.g., from 4 wt. % to 19 wt. %, from 6 wt. % to 18 wt. %, from 10 wt. % to 17 wt. %, from 12 wt. % to 16 wt. %, or from 14 wt. % to 16 wt. %, based on the total weight of the copolymer. In terms of upper limits, the copolymer of PA-6,6/6I comprises PA-6I in an amount less than 20 wt. %, e.g., less than 19 wt. %, less than 18 wt. %, less than 17 wt. %, less than 16 wt. %, or less than 15 wt. %. In terms of lower limits, the copolymer of PA-6,6/6I comprises PA-6I in an amount greater than 1 wt. %, e.g., greater than 2 wt. %, greater than 4 wt. %, greater than 6 wt. %, greater than 8 wt. %, greater than 10 wt. %, or greater than 12 wt. %. The remaining balance of the copolymer may comprise PA-6,6.

In some aspects, the polyamide composition may comprise a terpolymer comprising PA-6,6. In some embodiments, the terpolymer may comprise PA-6,6 in an amount ranging from 60 wt. % to 98 wt. %, e.g., from 65 wt. % to 96 wt. %, from 70 wt. % to 90 wt. %, from 75 wt. % to 85 wt. %, or from 80 wt. % to 85 wt. %, based on the total weight of the terpolymer. In terms of upper limits, the terpolymer may comprise PA-6,6 in an amount less than 98 wt. %, e.g., less than 96 wt. %, less than 94 wt. %, less than 92 wt. %, less than 90 wt. %, or less than 85 wt. %. In terms of lower limits, the terpolymer may comprise PA-6,6 in an amount greater than 60 wt. % PA-6,6, e.g., greater than 65 wt. %, greater than 70 wt. %, greater than 75 wt. %, greater than 80 wt. %, or greater than 84 wt. %.

In some embodiments, the polyamide composition may comprise a terpolymer comprising PA-6I. In some embodiments, the terpolymer may comprise PA-6I in an amount ranging from 2 wt. % to 20 wt. %, e.g., from 4 wt. % to 18 wt. %, from 5 wt. % to 16 wt. %, from 6 wt. % to 14 wt. %, or from 8 wt. % to 12 wt. %, based on the total weight of the terpolymer. In terms of upper limits, the terpolymer may comprise PA-6I in an amount less than 20 wt. %, e.g., less than 18 wt. %, less than 16 wt. %, less than 14 wt. %, less than 12 wt. %, or less than 10 wt. %. In terms of lower limits, the terpolymer may comprise PA-6I in an amount greater than 2 wt. %, e.g., greater than 3 wt. %, greater than 4 wt. %, greater than 5 wt. %, greater than 6 wt. %, greater than 7 wt. %, or greater than 8 wt. %.

In some embodiments, the polyamide composition may comprise a terpolymer comprising PA-6. In some embodiments, the terpolymer may comprise PA-6 in an amount ranging from 1 wt. % to 15 wt. %, e.g., from 2 wt. % to 12 wt. %, from 3 wt. % to 10 wt. %, from 4 wt. % to 8 wt. %, or from 5 wt. % to 7 wt. %, based on the total weight of the terpolymer. In terms of upper limits, the terpolymer may comprise PA-6 in an amount less than 15 wt. %, e.g., less than 14 wt. %, less than 12 wt. %, less than 10 wt. %, less than 8 wt. %, or less than 7 wt. %. In terms of lower limits, the terpolymer may comprise PA-6 in an amount greater than 1 wt. %, e.g., greater than 2 wt. %, greater than 3 wt. %, greater than 4 wt. %, greater than 5 wt. %, or greater than 6 wt. %.

In some embodiments, the polyamide composition may comprise a terpolymer of PA-6,6/6I/6. In some aspects, the terpolymer of PA-6,6/6I/6 comprises from 60 wt. % to 98 wt.

% of PA-6,6, from 2 wt. % to 20 wt. % of PA-6I, and from 1 wt. % to 15 wt. % of PA-6. In some aspects, the terpolymer of PA-6,6/6I/6 comprises from 1 wt. % to 20 wt. % PA-6, e.g., from 2 wt. % to 18 wt. %, from 4 wt. % to 16 wt. %, from 5 wt. % to 12 wt. %, or from 6 wt. % to 10 wt. %. In some aspects, the terpolymer of PA-6,6/6I/6 includes less than less than 14 wt. % PA-6, less than 12 wt. %, less than 10 wt. %, less than 8 wt. %, or less than 7 wt. %. In some aspects, the terpolymer of PA-6,6/6I/6 includes greater than 1 wt. % PA-6, e.g., greater than 2 wt. %, greater than 3 wt. %, greater than 4 wt. %, greater than 5 wt. %, or greater than 6 wt. %.

In some aspects, the polyamide composition may comprise polyamides produced through ring-opening polymerization or polycondensation, including the copolymerization and/or copolycondensation, of lactams. Without being bound by theory, these polyamides may include, for example, those produced from propriolactam, butyrolactam, valerolactam, and caprolactam. For example, in some embodiments, the polyamide is a polymer derived from the polymerization of caprolactam. Furthermore, the polyamide composition may comprise the polyamides produced through the copolymerization of a lactam with a nylon, for example, the product of the copolymerization of a caprolactam with PA-6,6.

In some embodiments, the polyamides can be condensation products of one or more dicarboxylic acids, one or more diamines, one or more aminocarboxylic acids, and/or ring-opening polymerization products of one or more cyclic lactams, e.g., caprolactam and laurolactam. In some aspects, the polyamides may include aliphatic, aromatic, and/or semi-aromatic polyamides and can be homopolymer, copolymer, terpolymer or higher order polymers. In some aspects, the polyamides includes blends of two or more polyamides. In some embodiments, the polyamide comprises aliphatic or aromatic polyamides or blends of two or more polyamides.

In some aspects, the dicarboxylic acids may comprise one or more of adipic acid, azelaic acid, terephthalic acid, isophthalic acid, sebacic acid, and dodecanedioic acid. In some aspects, the dicarboxylic acids may comprise adipic, isophthalic and terephthalic acid. In some aspects, the dicarboxylic acids may comprise an aminocarboxylic acid, e.g., 11-aminododecanoic acid.

In some aspects, the diamines may comprise one or more of tetramethylenediamine, hexamethylenediamine, octamethylenediamine, nonamethylenediamine, 2-methylpentamethylenediamine, 2-methyloctamethylenediamine, trimethylhexamethylenediamine, bis(p-aminocyclohexyl)methane, m-xylylenediamine, p-xylylenediamine, decamethylenediamine, undecamethylenediamine, dodecamethylenediamine, tridecamethylenediamine, tetramethylenediamine, pentamethylenediamine, hexamethylenediamine, and the like. Other examples of the aromatic diamine components, which are merely illustrative, include benzene diamines such as 1,4-diaminobenzene, 1,3-diaminobenzene, and 1,2-diaminobenzene; diphenyl(thio)ether diamines such as 4,4'-diaminodiphenylether, 3,4'-diaminodiphenylether, 3,3'-diaminodiphenylether, and 4,4'-diaminodiphenylthioether; benzophenone diamines such as 3,3'-diaminobenzophenone and 4,4'-diaminobenzophenone; diphenylphosphine diamines such as 3,3'-diaminodiphenylphosphine and 4,4'-diaminodiphenylphosphine; diphenylalkylene diamines such as 3,3'-diaminodiphenylmethane, 4,4'-diaminodiphenylmethane, 3,3'-diaminodiphenylpropane, and 4,4'-diaminodiphenylpropane; diphenyl sulfide diamines such as 3,3'-diaminodiphenylsulfide and 4,4'-diaminodiphenylsulfide; diphenylsulfone diamines such as 3,3'-diaminodiphenylsulfone and 4,4'-diaminodiphenylsulfone; and benzidines such as benzidine and 3,3'-dimethylbenzidine.

In some embodiments, the polyamides may comprise semi-aromatic polyamides. In some aspects, the semi-aromatic polyamides may comprise polyisophthalamides, polyterethalamides, or PA-MXD,6. In some aspects, the polyterethalamides comprise PA-12,T, PA-10,T, PA-9,T, PA-6,T/6,6, PA-6,T/D,T, copolymers, terpolymers, or mixtures thereof. In some aspects, the semi-aromatic polyamides may comprise hexamethylene isophthalamide (PA-6T/6I), hexamethylene adipamide (PA-6I/6,6), hexamethylene adipamide/hexamethylene terephthalamide/hexamethylene isophthalamide copolyamide (PA-6,6/6,T/6,I); poly(caprolactam-hexamethylene terephthalamide) (PA-6/6,T); and copolymers, terpolymers, and mixtures of these polymers.

In some embodiments, the polyamides may comprise aliphatic polyamides. In some embodiments, the polyamide comprises aliphatic polyamide copolymers and terpolymers comprising PA-6,6/6; PA-6,6/68; PA-6,6/610; PA-6,6/612; PA-6,6/10; PA-6,6/12; PA-6/68; PA-6/610; PA-6/612; PA-6/10; PA-6/12; PA-6/6,6/610; PA-6/6,6/69; PA-6/6,6/11; PA-6/6,6/12; PA-6/610/11; PA-6/610/12; and PA-6/6,6/PACM (bis-p-{aminocyclohexyl} methane).

In some aspects, the polyamide comprises physical blends of aliphatic polyamides, semiaromatic polyamides, and/or aromatic polyamides to obtain properties intermediate between or synergistic of the properties of each polyamide.

Etchable Filler

The polyamide composition may further include an etchable filler, e.g., an etchable particulate filler. In some embodiments, the etchable filler can be partially removed and/or altered by treatment (acid, base, thermal, solvent, etc.), (to accomplish the etching) under conditions which do not deleteriously affect the polymer composition. In some embodiments, the etchable filler is a material such as magnesium hydroxide, calcium carbonate or zinc oxide which can be removed, e.g., etched, by an aqueous acidic solution. Since the polymeric matrix will normally not be greatly affected by the treatment, only the etchable filler near the surface of the injection-molded article will be affected e.g., fully or partially removed.

The etchable filler is capable of being etched or removed by a surface preparation process for metallization, thereby creating surface roughness which can improve adhesion of the resultant injection-molded article to a metal plating. The etchable fillers, e.g., acid-etchable, can be any filler which can be removed by the surface preparation process. The fillers can be used alone or in combination with other fillers. In some embodiments, the etchable filler is magnesium hydroxide or calcium carbonate. It has been found that surface-treated magnesium hydroxide provides higher peel strength for the resultant injection-molded article.

In some aspects, the etchable filler can be etched with an etching solution. The pH of the etching solution used to treat the polymeric article surface can be an important aspect of treatment, as can treating temperature, agitation and time. In some aspects, the etching solution can be an aqueous acidic liquid mixture having a pH of less than 7, e.g., less than 6, less than 5, less than 4, less than 3, or less than 2. In some embodiments, the etching solution can be an aqueous acidic liquid mixture having a pH from 1-7, e.g., from 2-6, from 3-6, from 4-6, from 5-6, or from 2-5. Acidity can be established by the use of acids such as inorganic and organic acids. Non-limiting examples of inorganic acids that can be used as etchants include hydrochloric acid, sulfuric acid, nitric acid, and hydrofluoric acid. Non-limiting examples of organic acids include oxalic acid, acetic acid, benzoic acid, or the like. Buffers can also be used, established by the presence of one or more of bicarbonate, bifluoride, bisulphate, or similar compounds, with one or more of carbonic acid, carbonate, hydrofluoric acid, fluoride, sulfuric acid, sulfate, or similar compounds.

In some embodiments, the polyamide composition comprises etchable fillers in an amount ranging from 0.5 wt. % to 40 wt. %, e.g., from 1 wt. % to 38 wt. %, from 2 wt. % to 36 wt. %, from 4 wt. % to 32 wt. %, from 6 wt. % to 28 wt. %, from 8 wt. % to 24 wt. %, from 10 wt. % to 20 wt. %, from 12 wt. % to 18 wt. %, or from 14 wt. % to 16 wt. %, based on the total weight of the polyamide composition. In terms of upper limits, the polyamide composition includes less than 40 wt. % of etchable fillers, e.g., less than 38 wt. %, less than 34 wt. %, less than 30 wt. %, less than 26 wt. %, less than 22 wt. %, less than 18 wt. %, or less than 16 wt. %. In terms of lower limits, the polyamide composition includes greater than 0.5 wt. % of etchable fillers, e.g., greater than 1 wt. %, greater than 2 wt. %, greater than 4 wt. %, greater than 6 wt. %, greater than 8 wt. %, greater than 10 wt. %, greater than 12 wt. %, greater than 14 wt. %, or greater than 15 wt. %.

Conventionally, polyamide compositions for injection-molded articles use at least 25 wt. % of etchable fillers in the polyamide composition to achieve desired plating properties. It has been found that using less than 25 wt. % etchable fillers in the polyamide composition provides improved peel properties, e.g., peel strength, for metal plating applications. In other words, the present polyamide compositions were able to achieve desired plating properties at lower loadings of etchable fillers. In some aspects, the polyamide composition includes less than 25 wt. % etchable fillers, e.g., less than 24 wt. %, less than 22 wt. %, less than 20 wt. %, less than 18 wt. %, or less than 16 wt. %. In some aspects, the polyamide composition includes about 15 wt. % of etchable fillers.

In some embodiments, the etchable fillers have an average particle size ranging from 0.1 microns to 2.0 microns, e.g., from 0.2 microns to 1.9 microns, from 0.3 microns to 1.8 microns, from 0.4 microns to 1.6 microns, from 0.5 microns to 1.4 microns, from 0.6 microns to 1.2 microns, or from 0.8 microns to 1.1 microns. In terms of upper limits, the etchable fillers have an average particle size less than 2.0 microns, e.g., less than 1.8 microns, less than 1.7 microns, less than 1.6 microns, less than 1.5 microns, less than 1.4 microns, less than 1.2 microns, or less than 1 microns. In terms of upper limits, the etchable fillers have an average particle size greater than 0.1 microns, e.g., greater than 0.2 microns, greater than 0.3 microns, greater than 0.4 microns, greater than 0.5 microns, greater than 0.6 microns, greater than 0.7 microns, or greater than 0.8 microns.

In some embodiments, the etchable fillers have a $d_{90}$ ranging from 1.4 microns to 1.9 microns, e.g., from 1.5 microns to 1.8 microns or from 1.6 microns to 1.7 microns. In some embodiments, the etchable fillers have a $d_{50}$ ranging from 0.8 microns to 1.1 microns, e.g., from 0.85 microns to 1.05 microns or from 0.9 microns to 1 micron. In some embodiments, the etchable fillers have a $d_{10}$ ranging from 0.3 microns to 0.6 microns, e.g., from 0.35 microns to 0.55 microns or from 0.4 microns to 0.5 microns. In this regard, $d_{20}$, $d_{50}$ and $d_{90}$ are based on a volume distribution as measured by laser diffraction, e.g., using a laser diffraction software package $d_{50}$ is a median particle size value).

In some embodiments, the average particle dimensions of the etchable fillers can have a generally single peaked distribution. For example, all particles could have the same average particle dimension or, as another example, the particles could have a distribution of average particle dimensions, such as a Gaussian distribution, so that the average particle dimensions range above and below some mean value.

In some embodiments, the average particle dimension of the etchable fillers may have a multimodal distribution. For example, the average particles dimensions may have a bimodal distribution or higher modal distributions, e.g., trimodal. A multimodal distribution of particle dimensions could be useful to, for example, tailor the properties of the polyamide composition. In addition to distributions of size, other particle features, such as, for example, particle shape and particle composition, may be distributed about a single mean or may have a multimodal distribution. These other distributions of particle features may also be used to tailor one or more properties of the injection-molded article.

In some aspects, the distribution of particle diameters for the etchable fillers may have a first maximum ranging from 1.4 microns to 1.9 microns and a second maximum ranging from 2.4 microns to 4.4 microns. In some aspects, the distribution of particle diameters may have a first maximum ranging from 0.8 microns to 1.1 microns and a second maximum ranging from 1.5 microns to 2 microns. In some aspects, the distribution of particle diameters may have a first maximum ranging from 0.3 microns to 0.6 and a second maximum ranging from 0.7 microns to 1.1 microns. In some aspects, the bimodal distribution of particle diameters may be any one of these combination of ranges.

In some embodiments, the etchable fillers have a surface area ranging from 6 $m^2/g$ to 12 $m^2/g$, e.g., from 7 $m^2/g$ to 11.5 $m^2/g$, from 8 $m^2/g$ to 11 $m^2/g$, or from 9 $m^2/g$ to 10 $m^2/g$. terms of upper limits, the etchable fillers have a surface area less than 12 $m^2/g$, e.g., less than 11.5 $m^2/g$, less than 11 $m^2/g$, less than 10.5 $m^2/g$, or less than 10 $m^2/g$. In terms of lower limits, the etchable fillers have a surface area greater than 6 $m^2/g$, e.g., greater than 6.5 $m^2/g$, greater than 7 $m^2/g$, greater than 7.5 $m^2/g$, or greater than 8 $m^2/g$.

In some embodiments, the etchable fillers comprise metal salts and minerals such as: (a) metal carbonates, wherein the metal comprises one or more of barium, bismuth, cadmium, calcium, cobalt, copper, lead, magnesium, iron, nickel and zinc; (b) metal oxides, wherein the metal comprises one or more of aluminum, antimony, bismuth, cadmium, cerium, cobalt, copper, gallium, germanium, indium, iron, lead, manganese, nickel, tin, zinc and zirconium; (c) metal hydroxides, wherein the metal comprises one or more of bismuth, cerium, cobalt, copper, magnesium and manganese; (d) metal oxalates, wherein the metal comprises one or more of aluminum, calcium, cobalt, iron, lead, magnesium, manganese, nickel and tin; (e) metal orthophosphates, wherein the metal comprises one or more of aluminum, cadmium, cerium, chromium, cobalt, lead, lithium, magnesium, nickel, strontium, tin and zinc; (f) metal metasilicates, wherein the metal comprises one or more of barium, calcium (wollastonite), lead and lithium; and (g) metal pyrophosphates, wherein the metal comprises one or more of magnesium, manganese and nickel.

Furthermore, these etchable fillers can be treated with a compound to modify the properties of the etchable filler. Beneficially, the treated, e.g., surface-treated, etchable fillers, employed in the polyamide composition can make the composition more compatible with polyamides, e.g., nylon. In other aspects, the treated etchable fillers can also provide a compatible surface for etching. For example, the etchable fillers can be coat-treated with coupling agents. In some embodiments, a treated etchable filler can be provided in the polyamide composition. In some embodiments, the etchable filler can be extruded with a coupling agent to form a treated etchable filler.

In some aspects, the etchable filler is coat-treated with a silane coupling agent. The silane coupling agent may comprise vinylsilanes such as vinyltris(β-methoxyethoxy)silane, vinylethoxysilane and vinyltrimethoxysilane, (meth)acrylsilanes such as γ-methacryloxypropyltrimethoxysilane, epoxy silanes such as β-(3,4-epoxy-cyclohexyl)ethyltrimethoxysilane, β-(3,4-epoxy-cyclohexyl)methyltrimethoxysilane, β-(3,4-epoxy-cyclohexyl)ethyltriethoxysilane, γ-glycidoxypropyltrimethoxysilane and γ-glycidoxypropyltriethoxysilane, aminosilanes such as N-β-(aminoethyl)-γ-aminopropyltriethoxysilane, N-β-(aminoethyl)-γ-aminopropyltrimethoxysilane, N-β(aminoethyl)-γ-aminopropylmethyldiethoxysilane, γ-aminopropyltriethoxysilane, γ-aminopropyltrimethoxysilane, N-phenyl-γ-aminopropyltrimethoxysilane and N-phenyl-γ-aminopropyltriethoxysilan, and thiosilanes such as γ-mercaptopropyltrimethoxysilane and γ-mercaptopropyltriethoxysilane. In some aspects, the etchable filler is coat-treated with a vinylsilane coupling agent. In some aspects, the etchable filler is surface treated with an aminosilane coupling agent.

It has been found that utilizing an etchable filler comprising magnesium hydroxide coat-treated with a silane coupling agent improves thermal properties and peel strength of the injection-molded article formed from the polyamide composition. In some embodiments, the silane coupling agent comprises one or more of fatty acids, alkylsilanes, organic litanates, organic zirconates, aminosilanes, vinylsilanes, or siloxane derivatives. In some aspects, a vinylsilane coating on the etchable filler provides a polymer composition having a high peel strength.

In some embodiments, the etchable filler, e.g., magnesium hydroxide, includes a silane coupling agent ranging from 0.05 wt. % to 5.0 wt. %, e.g., from 0.08 wt. % to 4.5 wt. %, from 0.1 wt. % to 4.0 wt. %, from 0.5 wt. % to 3.5 wt. %, from 1 wt. % to 3 wt. %, or from 1.5 wt. % to 2.5 wt. %, based on the total weight of the etchable filler. In terms of upper limits, the etchable filler includes less than 5.0 wt. % silane coupling agent, e.g., less than 4.0 wt. %, less than 4.0 wt. %, less than 3.5 wt. %, or less than 3.0 wt. %, or less than 2.0 wt. %. In terms of lower limits, the etchable filler includes greater than 0.05 wt. % silane coupling agent, e.g., greater than 0.08 wt. %, greater than 0.1 wt. %, greater than 0.5 wt. %, or greater than 1 wt. %.

In some embodiments, the etchable filler can treated with other compounds in order to modify properties of the polyamide composition. In some aspects, the etchable filler is treated with a coupling agent such as an isocyanate compound, an organic silane compound, an organic titanate compound, an organic borane compound or an epoxy compound; a plasticizing agent such as a polyalkylene oxide oligomer compound, a thioether compound, an ester compound or an organic phosphorus compound; a crystal nucleus agent such as talc, kaoline, an organic phosphorus compound or polyether ether ketone; metal soap such as montanic wax, lithium stearate or aluminum stearate; a releasing agent such as ethylene diamine/strearic acid/sebacic acid polycondensate or a silicone compound; a color protection agent such as hypophosphite; and other general addition agents such as a lubricant, an ultraviolet light protection agent, a coloring agent, a flame retardant and a foaming agent.

Semi-Structural Mineral

The polyamide composition may optionally include one or more semi-structural mineral, e.g., semi-structural mineral filler(s). The polyamide composition may include any semi-structural mineral having various average diameters, cross sections, lengths, and aspect ratios. In some aspects, the semi-structural mineral can include ingredients such as glass, carbon, graphite, polymer, and the like. In some embodiments, the semi-structural mineral comprises kaolin particles. The optional semi-structural mineral used in the polyamide composition can be present in an amount less than 40 wt. %, based on the total weight of the polyamide composition.

In some embodiments, the polyamide composition may include semi-structural mineral in an amount ranging from 0.01 wt. % to 40 wt. %, e.g., from 1 wt. % to 36 wt. %, from 2 wt. % to 32 wt. %, from 6 wt. % to 28 wt. %, from 8 wt. % to 24 wt. %, from 10 wt. % to 20 wt. %, from 12 wt. % to 18 wt. %, or from 14 wt. % to 16 wt. %. In terms of upper limits, the polyamide composition includes less than 40 wt. % of semi-structural mineral, e.g., less than 36 wt. %, less than 32 wt. %, less than 28 wt. %, less than 24 wt. %, less than 20 wt. %, or less than 16 wt. %. In terms of lower limits, the polyamide composition includes greater than 0 wt. % of semi-structural mineral, e.g., greater than 2 wt. %, greater than 4 wt. %, greater than 8 wt. %, greater than 10 wt. %, greater than 12 wt. %, or greater than 14 wt. %. In some embodiments, the polyamide composition may be substantially free of semi-structural mineral, e.g., contains no semi-structural mineral.

In some aspects, the semi-structural mineral may comprise one or more of talc, mica, silicates, quartz, wollastonite, kaolin, calcined kaolin, hydrous kaolin, silicic acids, magnesium carbonate, chalk, ground or cut calcium carbonate, lime, feldspar, inorganic pigments, such as barium sulphate, zinc oxide, zinc sulphide, titanium dioxide, ferric oxide, ferric manganese oxide, metal oxides, especially spinels, such as for example copper ferric spinel, copper chromium oxide, zinc ferric oxide, cobalt-chromium oxide, cobalt-aluminium oxide, magnesium aluminium oxide, copper-chromium-manganese-compound oxide, copper-manganese-iron-compound oxide, rutile pigments such as titanium-zinc-rutile, nickel-antimony-titanate, permanent magnetic or magnetisable metals or alloys, concave silicate filler material, aluminium oxide, boron nitride, boron carbide, aluminium nitride, calcium fluoride, and compounds thereof. In some aspects, the semi-structural mineral can be one or more of kaolin, mica, talc, and wollastonite. In some aspects, the semi-structural mineral can be surface treated as described herein.

In some aspects, the semi-structural mineral used in the polyamide composition can be hydrated, such as hydrous kaolin or hydrous clay, such that a vapor is released during the compounding and molding process that can be used to form porosity within the polyamide. In some aspects, water chemically bound to a semi-structural mineral can be released when the composite is subject to excessive heat and can also act as a fire retardant. In some aspects, the polyamide composition includes calcite kaolin, treated kaolin, or mixtures thereof. In some aspects, the kaolin is a surface-treated kaolin, e.g., commercially available Polarite 102A from Imerys, which is a calcined and silane-treated kaolin. In some aspects, the semi-structural mineral comprises a calcined and surface-treated alumino-silicate, e.g., $Al_2Si_2O_5(OH)_4$.

In some embodiments, the polyamide composition may include one or more commercially available semi-structural minerals, e.g., commercially available kaolin. The commercially available semi-structural minerals may include Hydrite® SB 100s from Imerys Kaolin, Polarite 102A, Polarite 502A, Polarite 702A, or Polarite 902A from Imerys Kaolin, and/or Translink® 445 or Translink® 555 from BASF. In some aspects, the commercially available semi-structural minerals may be spray dried and/or pulverized, e.g., spray dried Polarite 702A. In some aspects, the commercially available semi-structural minerals may be mixed with any of the aforementioned semi-structural minerals.

Glass Fibers

The polyamide composition includes glass fibers, e.g., to form a glass reinforced polyamide composition. The glass-reinforced polyamide composition greatly improves the strength, rigidity, heat resistance, and impact strength of an injection-molded article. In some embodiments, the polyamide composition includes glass fibers in an amount ranging from 10 wt. % to 30 wt. %, e.g., from 12 wt. % to 28 wt. %, from 12 wt. % to 26 wt. %, from 14 wt. % to 24 wt. %, from 16 wt. % to 22 wt. %, or from 18 wt. % to 20 wt. %. In terms of upper limits, the polyamide composition includes less than 30 wt. % of glass fibers, e.g., less than 26 wt. %, less than 24 wt. %, less than 22 wt. %, less than 20 wt. %, less than 18 wt. %, or less than 16 wt. %. In terms of lower limits, the polyamide composition includes greater than 2 wt. % of glass fibers, e.g., greater than 4 wt. %, greater than 8 wt. %, greater than 10 wt. %, greater than 12 wt. %, or greater than 14 wt. %.

In some embodiments, the polyamide composition may comprise glass fibers having an average diameter ranging from 1 microns to 10 microns, e.g., from 2 microns to 9.5 microns, from 3 microns to 9 microns, from 3.5 microns to 8.5 microns, from 4 microns to 8 microns, from 4.5 microns to 7.5 microns, from 5 microns to 7 microns, or from 5.5 microns to 6.5 microns. In terms of upper limits, the polyamide composition includes glass fibers having an average diameter up to 10 microns (including 10 microns), e.g., up to 9.5 microns, up to 9 microns, up to 8.5 microns, up to 8 microns, up to 7.5 microns, or up to 7 microns. In terms of lower limits, the polyamide composition includes glass fibers having an average diameter greater than 1 microns, e.g., greater than 2 microns, greater than 3 microns, greater than 4 microns, greater than 5 microns, or greater than 6 microns. In some aspects, at least 70% of the glass fibers have diameter ranging from 1 microns to 10 microns, e.g., at least 75%, at least 80%, at least 85%, at least 90%, at least 95%, or at least 99%.

In some embodiments, the polyamide composition includes short glass fibers having a pre-compounding length ranging from 3 mm to 5 mm and an average diameter ranging from 1 micron to 10 microns. After compounding, the glass fibers may have a length ranging from 0.1 mm to 1 mm. In some aspects, the short glass fibers have a circular and/or noncircular cross section.

In some aspects, the glass fibers comprises a mixture of one or more glass fibers. The glass fibers can be chopped into lengths or "continuous" and have various diameters, cross sections, lengths, and aspect ratios. In some aspects, the glass fibers may comprise ingredients such as glass, carbon, graphite, graphene, and polymer. In some aspects, the glass fibers are short chopped glass fibers with a circular cross section. In some aspects, mixtures of glass fibers with circular and noncircular cross sections can also be used to strengthen the injection-molded articles. In some aspects, the glass fibers, independent of the shape of the cross-sectional surface and length of the fibers, may comprise one or more of A glass fibers, C glass fibers, D glass fibers, M glass fibers, S glass fibers, and/or R glass fibers, and E glass fibers. Commercially available glass fibers that may be suitable include NEG T-289DE from Nippon Electric—circular cross section glass fibers (E-glass fiber with a 6.5 micron diameter).

Additives

In some embodiments, the polymer composition can optionally include one or more additive(s). In some embodiments, the additives comprise one or more of catalyst, polymers other than polyamide, adhesion promoters, ions, compounds, preservatives such as heat stabilizers and antioxidants, lubricants, flow enhancers, or other ingredients as known in the art. The additive(s) may include at least one of: inorganic stabilizers, organic stabilizers, flame retardants, lubricants, dyes, pigments, nucleating agents, metal flakes, impact modifiers, antistatic agents, conductivity additives, mold-release agents, optical brighteners, adhesion promoters, ageing inhibitors, antioxidants, antiozonants, light stabilizers, UV stabilizers, UV absorbers, UV blockers, inorganic heat stabilizers, organic heat stabilizers, processing aids, crystallization accelerators, crystallization retarders, flow aids, fibrous materials and particulate fillers.

In some embodiments, the polyamide composition may include one or more optional additive(s) in an amount ranging from 0.1 wt. % to 13 wt. %, e.g., from 0.5 wt. % to 12 wt. %, from 0.8 wt. % to 10 wt. %, from 1 wt. % to 9 wt. %, from 2 wt. % to 8 wt. %, from 3 wt. % to 7 wt. %, or from 4 wt. % to 6 wt. %, based on the total weight of the polyamide composition. In terms of upper limits, the polyamide composition includes less than 13 wt. % of additive(s), e.g., less than 12 wt. %, less than 11 wt. %, less than 10 wt. %, less than 9 wt. %, less than 8 wt. %, less than 6 wt. %, less than 4 wt. %, or less than 2 wt. %. In terms of lower limits, the polyamide composition includes greater than 0.1 wt. % of additive(s), e.g., greater than 0.1 wt. %, greater than 0.2 wt. %, greater than 0.4 wt. %, greater than 0.6 wt. %, greater than 0.8 wt. %, greater than 1 wt. %, or greater than 1.5 wt. %.

In some embodiments, the additives comprise at least pigment. In some aspects, the pigment may be nigrosine. In some embodiments, the polyamide composition includes pigment in an amount ranging from 1 wt. % to 10 wt. %, e.g., from 2 wt. % to 9 wt. %, from 3 wt. % to 8 wt. %, from 4 wt. % to 7 wt. %, or from 5 wt. % to 6 wt. %, based on the total weight of the polyamide composition. In terms of upper limits, the polyamide composition includes less than 10 wt. % pigment e.g., less than 9 wt. %, less than 8 wt. %, less than 7 wt. %, less than 6 wt. %, or less than 5 wt. %. In terms of lower limits, the polyamide composition includes greater than 1 wt. % pigment e.g., greater than 1.5 wt. %, greater than 2 wt. %, greater than 2.5 wt. %, greater than 3 wt. %, greater than 4 wt. %, or greater than 4.5 wt. %.

In some embodiments, the additives comprise at least lubricant. In some aspects, the lubricant may be zinc stearate. In some embodiments, the polyamide composition includes lubricant in an amount ranging from 0.05 wt. % to 1 wt. %, e.g., from 0.06 wt. % to 0.8 wt. %, from 0.08 wt. % to 0.6 wt. %, from 0.1 wt. % to 0.4 wt. %, or from 0.2 wt. % to 0.3 wt. %, based on the total weight of the polyamide composition. In terms of upper limits, the polyamide composition includes less than 1 wt. %, lubricant e.g., less than 0.8 wt. %, less than 0.6 wt. %, less than 0.4 wt. %, less than 0.3 wt. %, less than 0.2 wt. %, or less than 0.15 wt. %. In terms of lower limits, the polyamide composition includes greater than 0.05 wt. % lubricant, e.g., greater than 0.06 wt.

%, greater than 0.07 wt. %, greater than 0.08 wt. %, greater than 0.09 wt. %, greater than 0.1 wt. %, or greater than 0.125 wt. %.

In some embodiments, the additives comprise at least one processing aid. In some embodiments, the polyamide composition includes processing aid in an amount ranging from 0.25 wt. % to 2 wt. %, e.g., from 0.3 wt. % to 1.8 wt. %, from 0.4 wt. % to 1.6 wt. %, from 0.8 wt. % to 1.4 wt. %, or from 1.0 wt. % to 1.2 wt. %, based on the total weight of the polyamide composition. In terms of upper limits, the polyamide composition includes less than 2 wt. % processing aid, e.g., less than 1.8 wt. %, less than 1.6 wt. %, less than 1.4 wt. %, less than 1.2 wt. %, less than 1.1 wt. %, or less than 1 wt. %. In terms of lower limits, the polyamide composition includes greater than 0.25 wt. % processing aid, e.g., greater than 0.3 wt. %, greater than 0.4 wt. %, greater than 0.4 wt. %, greater than 0.6 wt. %, greater than 0.7 wt. %, or greater than 0.8 wt. %. In some aspects, the processing aid may comprise NYLOSTAB S-EED. NYLOSTAB S-EED provides stability of compound melt processing and melt pressure during polymerization. NYLOSTAB S-EED also improves the surface appearance of injection molded parts, including but not limited to narrow part areas or in areas of sharp angles, such as reduction of blush in the molded part gate area.

In some embodiments, the additive in the polyamide composition comprises from 1 wt. % to 10 wt. % of pigment, from 0.05 wt. % to 1 wt. % of lubricant, and/or from 0.25 wt. % to 2 wt. % of processing aid. In some aspects, the pigment comprises a thermally stable nigrosine. In some aspects, the lubricant comprises zinc stearate. In some aspects, the processing aid comprises a substituted piperidine compound, e.g., NYLOSTAB S-EED®.

In some embodiments, the additive may further include a cross-linking agent, e.g., triaminononane. In some aspects, the cross linking agents are co-monomers used in co-polymer preparation, e.g., TAN, triaminononane (PA-6,6/6, I/TAN (84.5%/15%/0.5%) with 2.7-3.1 microequivalents per gram of acetic acid end-capping agent). In some aspects, the cross-linking agent is added during polymerization of the polyamide composition.

Properties of the Polyamide Compositions

As mentioned above, the polyamide compositions described herein beneficially impart both aesthetic and structural properties to resulting injection-molded articles. The specific combination of components in the polyamide compositions synergistically improves the structural properties, e.g., melting point, density, tensile strength, tensile modulus, flex strength, flex modulus, elongation, and/or HDT, while also improving the surface finish, e.g., DOI and R-value, of resulting injection-molded articles. Unlike ABS or PC/ABS, the physical properties of polyamide compositions were found to be sufficient for use in structural engineering applications since their tensile strength and HDT exceed requirements for engineering plastics.

In some embodiments, the polyamide compositions may have a melting point greater than 200° C., e.g., greater than 210° C., greater than 220° C., greater than 230° C., or greater than 240° C. In some embodiments, the polyamides may have a melting point less than 300° C., e.g., less than 290° C., less than 280° C., less than 275° C., less than 270° C., or less than 260° C. In some embodiments, the polyamides may have a melting point ranging from 200° C. to 290° C., e.g., from 210° C. to 280° C., from 220° C. to 270° C., from 230° C. to 260° C., from 235° C. to 255° C., or from 240° C. to 250° C.

In some embodiments, the polyamide compositions may have a density ranging from 1.1 g/cm$^3$ to 2.0 g/cm$^3$, e.g., from 1.2 g/cm$^3$ to 1.9 g/cm$^3$, from 1.25 g/cm$^3$ to 1.85 g/cm$^3$, from 1.3 g/cm$^3$ to 1.8 g/cm$^3$, from 1.4 g/cm$^3$ to 1.7 g/cm$^3$, from 1.3 g/cm$^3$ to 1.6 g/cm$^3$, or from 1.5 g/cm$^3$ to 1.7 g/cm$^3$. In some embodiments, the polyamide compositions may have a density less than 2.0 g/cm$^3$, e.g., less than 1.9 g/cm$^3$, less than 1.8 g/cm$^3$, less than 1.7 g/cm$^3$, less than 2.5 g/cm$^3$, less than 1.6 g/cm$^3$, or less than 1.55 g/cm$^3$. In some embodiments, the polyamide compositions may have a density greater than 1.1 g/cm$^3$, e.g., greater than 1.2 g/cm$^3$, greater than 1.25 g/cm$^3$, greater than 1.3 g/cm$^3$, greater than 1.35 g/cm$^3$, greater than 1.4 g/cm$^3$, or greater than 1.45 g/cm$^3$.

In some embodiments, the polyamide compositions may have a heat distortion temperature (HDT) ranging from 195° C. to 225° C., e.g., from 198° C. to 222° C., from 200° C. to 220° C., from 204° C. to 216° C., from 205° C. to 215° C., or from 210° C. to 220° C. In some embodiments, the polyamide compositions may have a HDT greater than 195° C., e.g., greater than 198° C., greater than 200° C., greater than 202° C., greater than 205° C., or greater than 208° C. In some embodiments, the polyamides may have a HDT less than 225° C., e.g., less than 222° C., less than 220° C., less than 218° C., less than 215° C., or less than 210° C.

In some embodiments, the polyamide composition may have a tensile strength ranging from 120 MPa to 150 MPa, e.g., from 125 MPa to 145 MPa, from 130 MPa to 140 MPa, from 135 MPa to 145 MPa, or from 140 MPa to 150 MPa. In some embodiments, the polyamide composition may have a tensile strength less than 150 MPa, e.g., less than 148 MPa, less than 146 MPa, less than 144 MPa, less than 142 MPa, or less than 140 MPa. In some embodiments, the polyamide composition may have a tensile strength greater than 120 MPa, e.g., greater than 122 MPa, greater than 124 MPa, greater than 126 MPa, greater than 128 MPa, or greater than 130 MPa. Tensile strength may be measured using ASTM D638 (current year).

In some embodiments, the polyamide composition may have a tensile modulus ranging from 6900 MPa to 10,000 MPa, e.g., from 7000 MPa to 9600 MPa, from 7200 MPa to 9400 MPa, from 7500 MPa to 9000 MPa, from 7800 MPa to 8800 MPa, from 8000 MPa to 8600 MPa, or from 8200 MPa to 8500 MPa. In some aspects, the polyamide composition may have a tensile modulus less than 10,000 MPa, e.g., less than 9800 MPa, less than 9400 MPa, less than 9200 MPa, less than 9000 MPa, or less than 8500 MPa. In some aspects, the polyamide composition may have a tensile modulus greater than 6900 MPa, e.g., greater than 7200 MPa, greater than 7400 MPa, greater than 7800 MPa, greater than 8000 MPa, or greater than 8200 MPa. Tensile modulus may be measured using ASTM D638 (current year).

In some embodiments, the polyamide composition may have a flex strength ranging from 160 MPa to 220 MPa, e.g., from 170 MPa to 210 MPa, from 175 MPa to 205 MPa, from 180 MPa to 200 MPa, or from 185 MPa to 195 MPa. In some aspects, the polyamide composition may have a flex strength less than 220 MPa, e.g., less than 215 MPa, less than 210 MPa, less than 205 MPa, less than 200 MPa, or less than 195 MPa. In some aspects, the polyamide composition may have a flex strength greater than 160 MPa, e.g., greater than 165 MPa, greater than 170 MPa, greater than 175 MPa, greater than 180 MPa, or greater than 185 MPa. Flex or flexural strength may be measured using ASTM D790 (current year).

In some embodiments, the polyamide composition may have an elongation in range from 1% to 5%, e.g., from 1.5% to 4.5%, from 2% to 4%, from 2.5% to 3.5%, or from 2% to 3%. In some aspects, the polyamide composition may have a elongation less than 5%, e.g., less than 4.5%, less than 4.0%, less than 3.5%, less than 3.25%, or less than 3%. In some aspects, the polyamide composition may have a elongation greater than 1%, e.g., greater than 1.5%, greater than 2%, greater than 2.25%, greater than 2.5%, or greater than 2.75%. Elongation may be measured using ASTM D638 (current year).

In some embodiments, the polyamide compositions may have a notched IZOD impact strength ranging from 2 kJ/m$^2$ to 5 kJ/m$^2$, e.g., from 2.5 kJ/m$^2$ to 4.5 kJ/m$^2$, from 3 kJ/m$^2$ to 4 kJ/m$^2$, from 3.5 kJ/m$^2$ to 4.5 kJ/m$^2$, or from 4 kJ/m$^2$ to 5 kJ/m$^2$. In some embodiments, the polyamide compositions may have a notched IZOD impact strength less than 5 kJ/m$^2$, e.g., less than 4.8 kJ/m$^2$, less than 4.5 kJ/m$^2$, less than 4 kJ/m$^2$, less 3.75 kJ/m$^2$, or less than 3.5 kJ/m$^2$. In some embodiments, the polyamide compositions may have a notched IZOD impact strength greater than 2 g/cm$^3$, e.g., greater than 2.2 kJ/m$^2$, greater than 2.4 kJ/m$^2$, greater than 2.6 kJ/m$^2$, greater than 2.8 kJ/m$^2$, greater than 3 kJ/m$^2$, or greater than 3.2 kJ/m$^2$. Impact strength may be measured using ASTM D256 (current year).

It has been found that polyamide compositions including the specific combination of polyamides, etchable fillers, glass fibers, and optional additives, improve surface appearance. The surface appearance of the metal-plated injection-molded was characterized by nominal orange peel (R-value) and distinctness of image (DOI). The metal-plated injection molded articles were evaluated using Byk Gardner Wave Scan meter (manufactured by BYK-Gardner, Columbia, Md.) to determine the DOI and R-value. R-value and DOI may be measured using the publicly-available test parameters and procedures established by BYK-Gardner (current year).

DOI is an objective appearance criterion for brilliance and gloss which includes the visual effects from a rough or bumpy coating surface, sometimes referred to as "orange peel." The metal-plated surfaces of the injection-molded articles resulting from the polyamide composition described herein exhibit a high DOI.

The R-value is calculated from longwave and shortwave correlated to the visual rating of the orange peel panels of the company ACT® (USA). The R-value is calculated according to Formula (I):

$$R=10.5-4*\log(a-0.02*|b-20|) \quad (I),$$

The longwave is the variance of the amplitude of the longwave signal, major contribution (a) to R. The shortwave is the variance of the amplitude of the shortwave signal, very minor contribution (b) to R.

In some embodiments, the injection-molded articles produced from the polyamide composition may have a DOI greater than 50, e.g., greater than 55, greater than 60, greater than 65, greater than 70, or greater than 75. In some aspects, the injection-molded articles have a DOI ranging from 50 to 99.9, e.g., from 55 to 90, from 60 to 85, from 65 to 80, or from 70 to 75. In terms of upper limits, the DOI is less than 99.9, e.g., less than 99, less than 95, less than 90, less than 85, less than 80, or less than 75. Values closer to 100 indicate a smoother and glossier surface as determined by the Byk Gardner Wave Scan meter.

In some embodiments, the injection-molded articles produced from the polyamide composition may have a high R-value as measured by a BYK Gardner Wavescan meter. The injection-molded articles have R-values greater than 5, e.g., greater than 5.2, greater than 5.4, greater than 5.6, greater than 5.8, greater than 6.0, greater than 6.2, greater than 6.4, or greater than 6.5. In some aspects, the injection-molded articles have R-values ranging from 5 to 11, e.g., from 5.5 to 10.5, from 6.2 to 9, from 6.4 to 8.5, or from 6.5 to 7.5. In terms of upper limits, the R-value is less than 11, e.g., less than 10.5, less than 10, less than 9.5, or less than 9.0.

In some embodiments, the injection-molded articles produced from the polyamide composition may have a longwave as measured by a BYK Gardner Wavescan meter from 5 to 20, e.g., from 6 to 18, from 7 to 16, from 8 to 15, from 9 to 14, from 10 to 13.5, or from 10.5 to 13. In terms of upper limits, the injection-molded articles produced from the polyamide composition may have a longwave less than 20, e.g., less than 19, less than 18, less than 17, less than 16, or less than 15. In terms of lower limits, the injection-molded articles produced from the polyamide composition may have a longwave greater than 5, e.g., greater than 5.5, greater than 6, greater than 6.5, greater than 7, greater than 7.5, greater than 8, greater than 8.5, or greater than 9.

Metal-Plated Injection-Molded Articles

The polyamide compositions described herein can be used to form injection-molded articles that can be used in a variety of applications. Generally, injection-molded articles can be formed by injection molding a polyamide composition and subsequently removing the molded article from the mold and cooling. In some embodiments, the process for preparing an injection-molded article includes: providing any one of the polyamide compositions described herein: heating the polyamide composition; filling a mold cavity with the heated polyamide composition; and cooling the heated polyamide composition to form the injection-molded article It is possible to coat thermoplastic polymers with metals. Such coatings are utilized for aesthetic purposes, e.g., chrome-plating, to improve the mechanical properties of the injection-molded article, and to improve other properties such as electromagnetic shielding. It is desirable for the metal coating to have a strong bond to the surface of the polymer so that the coating is not easily removed or compromised in normal use. It has been found that utilizing an etachable filler, e.g., magnesium hydroxide, coat-treated with a silane coupling agent improves peel strength of the injection-molded article formed from the polyamide composition. In particular, a vinylsilane coating on the etchable filler provides a polymer composition having a higher peel strength than conventional plated injection-molded articles.

The strength of the bond between the metal coating and the injection-molded article may be determined by measuring the peel strength of the metal-polymer interface. Peel strengths/adhesion between polyamide composition and metal coated on the polymer have traditionally only been used for decorative/aesthetic applications due to their poor adhesion performance. Increasing the peel strengths/adhesion between the substrate and deposited metals allows use of the metal coated polyamide article in more demanding higher performance applications.

In some embodiments, the polyamide compositions described herein form injection molding articles that are capable of being metal-plated. The metal may be put onto the inject-molded article using a variety of methods, such as electroless metal deposition, electrolytic plating, vacuum metallization, different sputtering methods, lamination of metal foil onto the thermoplastic, etc. In some embodiments, process of plating the injection-molded article includes etching a filled thermoplastic resin substrate with a dilute acid solution, treating with a sensitizer such as a tin salt, activating with a noble metal salt solution, electroless metal deposition using an electroless copper or nickel plating solution, and electrolytic plating with a metal selected from the group comprising copper, nickel, chromium, or combinations thereof.

Conventionally, chromium has been plated from aqueous chromic acid baths that include chromium in hexavalent form. Other polymer compositions, e.g., ABS and PC/ABS, require the use of hexavalent chromium for etching out butadiene in preparation for chrome plating applications. In this process, the chromic acid fumes emitted as a result of hydrogen evolution present a considerable health hazard. The Center for Disease Control (CDC) has long recognized hexavalent chromium as a well-established carcinogen from exposure to high concentrations of airborne hexavalent chromium during certain applications, e.g., electroplating, welding, and chrome painting. Furthermore, the concentration of chromium in such baths is extremely high, leading to problems of waste or recovery because of so-called "dragout" of chromium compounds into the rinse tanks which follow the plating bath.

It has been found that injection-molded articles formed from the polyamide compositions described herein can be etched with solutions that do not contain toxic or carcinogenic materials, e.g., hexavalent chromium.

In general, the process for coating or plating a polyamide article with metal comprises several steps. In some embodiments, the polyamide surface is treated by etching the surface of the injection-molded article with an etching solution. The etching solution may comprise an acid, e.g., an acid solution, a dilute acid solution, a concentrated acid mixture, or mixtures thereof. In some aspects, when the disclosed polyamide compositions are used, the use of carcinogenic materials, e.g., hexavalent chromium, are not employed in the etching solution. The polymer surface preparation may include other steps besides etching. After etching, the etched surface of the injection-molded article is plated with a metal comprising one or more of copper, manganese, tin, nickel, iron, chrome, zinc, gold, platinum, cobalt, phosphorus, aluminum, and alloys thereof. In some aspects, the etched surface of the injection-molded article is plated with chrome.

In some embodiments, the surface of the injection-molded article treated with the etching solution is activated with metal ions followed by electroless plating with a metal. The final step is electrolytically plating a metal onto the injection-molded article surface. Certain steps are typically conducted sequentially, in which case it can be advantageous to carry out pretreatments or post treatments (such as washing, cleaning, drying, heating, and partial or full neutralization of pH extremes) while optionally the treating solutions are agitated or undergo ultrasonification during these operations. In some embodiments, the polyamide compositions disclosed herein are capable of being plated using an etching solution comprising low amounts or, if any, hexavalent chromium.

Beneficially, the polyamide compositions also produce an injection-molded article with improved peel strength between the article and the metal plating. In some embodiments, the injection-molded articles produced from the polyamide compositions described herein have sufficient adhesion so that it does not separate from the thermoplastic substrate during use. The resulting electroplated articles exhibit a mirror-like finish and a high peel strength. In some aspects, the injection-molded articles are plated with a metal including at least one of copper, manganese, tin, nickel, iron, chrome, zinc, gold, platinum, cobalt, phosphorus, aluminum and alloys of these metals.

In some embodiments, the metal coating can comprise at least one metal in elemental form, alloys of such, or metal matrix composites. The coating may be applied layer by layer, and can have a thickness ranging from 1 microns to 50 microns, e.g., 2 microns to 48 microns, 5 microns to 45 microns, 10 microns to 42 microns, from 15 microns to 40 microns, from 18 microns to 38 microns, from 20 microns to 36 microns, from 25 microns to 35 microns, from 26 microns to 34 microns, or from 28 microns to 32 microns. In some aspects, the thickness of the coating is less than 50 microns, e.g., less than 48 microns, less than 46 microns, less than 44 microns, less than 42 microns, less than 40 microns, less than 38 microns, or less than 35 microns. In some aspects, the thickness of the coating is greater than 1 microns, e.g., greater than 2 microns, greater than 5 microns, greater than 8 microns, greater than 10 microns, greater than 10 microns, greater than 20 microns, or greater than 25 microns.

In some aspects, it is useful to apply more than one layers of different metals in a combination that may offer a desired advantage. For example, a more ductile metal such as copper may be used for the first layer, and a stronger metal, e.g., palladium, nickel, iron, cobalt, tin, or other metals or their alloys, may be used for the outer layer for their strength and hardness. In some aspects, the injection-molded article may be coated with multiple layers comprising one or more of palladium, nickel, electroless nickel, copper, electroless copper, and chrome. In some aspects, the injection-molded article may be provided with a palladium base and treated, e.g., coated, with one or more of nickel, electroless nickel, copper, or chrome.

In some aspects, the polyamide composition may comprise a copolymer comprising PA-6,6 and PA-6I, wherein the composition includes glass fibers having an average diameter ranging from 4 μm to 8 μm, wherein the composition has a density ranging from 1.3 g/cm$^3$ to 1.6 g/cm$^3$, wherein the composition has a distinctness of image greater than 65 as measured by Byk Gardner Wave Scan meter, wherein the composition has a R-value greater than 7 as measured by Byk Gardner Wave Scan meter.

In some aspects, the polyamide composition may comprise a terpolymer comprising PA-6,6, PA-6I, and PA-6, wherein the composition includes glass fibers having an average diameter ranging from 4 μm to 8 μm, wherein the composition has a density ranging from 1.3 g/cm$^3$ to 1.6 g/cm$^3$, wherein the composition has a distinctness of image greater than 65 as measured by Byk Gardner Wave Scan meter, wherein the composition has a R-value greater than 7 as measured by Byk Gardner Wave Scan meter.

The injection-molded articles produced from the polyamide composition have a low dullness as measured by a BYK Gardner Wavescan meter. In some embodiments, the injection-molded articles have a dullness ranging from 1 to 80, e.g., from 2 to 60, from 3 to 50, from 4 to 40, from 5 to 30, from 6 to 20, or from 7 to 15. In terms of upper limits, the injection-molded articles have a dullness less than 80, e.g., less than 70, less than 60, less than 50, less than 40, less than 30, less than 25, less than 20, or less than 10. In terms of lower limits, the injection-molded articles have a dullness greater than 1, e.g., greater than 2, greater than 3, greater than 4, greater than 5, greater than 6, greater than 7, greater than 8, or greater than 9.

Applications where high peel strength is desirable include electrical and electronic components, personal digital assistant (PDA), cell and mobile phone components, computer notebook components, and the like, automotive components, aerospace parts, defense parts, consumer products, medical components and sporting goods. Suitable parts include tubes or shafts used in sporting goods such as ski and hiking poles, fishing rods, golf club shafts, hockey sticks, lacrosse sticks, baseball/softball bats, bicycle frames, skate blades, snow boards. Other applications include plates such as golf club head face plates and complex shapes such as sports racquets (tennis, racquetball, squash and the like), golf club heads, automotive grill-guards, pedals such as brake and gas petals, fuel rails, running boards, spoilers, muffler tips, wheels, vehicle frames, structural brackets, and similar articles. The article, whose surface is to be coated with metal, can be formed by processes such as by injection molding a polymer composition and subsequently removing the molded article from the mold and cooling.

EXAMPLES

Examples 1 and 2 were prepared by blending the following components in the amounts shown in Table 1:
PA-6,6/6I comprising 6 wt. % of PA-6,I (Example 1) or PA-6/6I/6 comprising 10 wt. % of PA-6I and 6 wt. % of PA-6 (Example 2);
Glass fibers, namely, NEG T-289DE—circular cross section glass fibers from Nippon Electric (E-Glass fiber with a 6.5 micron diameter);
vinylsilane-coated magnesium hydroxide, namely, Magnifin® H-10 A from Magnifin GmbH in Bergheim (etchable filler);
nigrosine pigment from Orient Chemicals (NA-143);
zinc stearate (additive) (NA-095); and
NYLOSTAB S-EED (hindered amine stabilizer marketed by Clariant GmbH, Augsburg, Germany (additive), and described as 1,3-benzendicarboxamide, N, N'-bis(2,2, 6,6-tetramethyl-4-piperidinyl).

TABLE 1

| Components | Example 1 (wt. %) | Example 2 (wt. %) |
|---|---|---|
| PA-6,6/6I | 70.7 | |
| PA-6,6/6I/6 | | 70.7 |
| Fiberglass | 15.0 | 15.0 |
| Vinylsilane Coated Magnesium Hydroxide | 10.0 | 10.0 |
| NYLOSTAB S-EED | 0.75 | 0.75 |
| Nigrosine | 3.5 | 3.5 |
| Zinc Stearate | 0.1 | 0.1 |

Injection-molded articles were formed in accordance with the methods discussed herein. The injection molded articles demonstrated a superior combination of aesthetic properties and improved structural properties as compared to injection-molded articles formed from traditional polyamide compositions.

Examples 3-5 and Comparative Examples A-H were prepared by blending the following components in the amounts shown in Table 2. Examples 3-5 comprised polyamide, etchable filler, and glass fibers having a low average median diameter, e.g., up to 10 microns (~6.5 microns). Comparative Examples A-E comprised glass fibers that had a high average median diameter, e.g., greater than 10 microns. Comparative Examples F-H did not comprise any etchable filler. The polyamide compositions were used to produce the injection-molded polyamide articles. The weight percentages are based on the total weight of the polyamide composition unless otherwise indicated. The injection-molded articles were tested for aesthetic properties and physical properties. The results are shown in Tables 3 and 4.

TABLE 2

| | Polyamide (wt. %) | | Capro (% of PA) | PA6,I (% of PA) | Etchable Filler (wt. %) | Semi-structural Mineral (wt. %) | Glass Fiber (wt. %) | | S-EED (wt. %) | Nigrosine (wt. %) | Zinc Stearate (wt. %) |
|---|---|---|---|---|---|---|---|---|---|---|---|
| Comp. A | 56.4 | PA6,6/6 | 6 | 0 | 25 MDH-VS | | 15 | PPG-3610 | | 3.5 | 0.1 |
| Comp. B | 56.4 | PA6,6/6,I/6 | 6 | 4 | 25 MDH-VS | | 15 | PPG-3610 | | 3.5 | 0.1 |
| Comp. C | 56.4 | PA6,6/6,I/6 | 6 | 6 | 25 MDH-VS | | 15 | PPG-3610 | | 3.5 | 0.1 |
| Comp. D | 55.7 | PA6,6/6,I/6 | 6 | 6 | 25 MDH-VS | | 15 | PPG-3610 | 0.75 | 3.5 | 0.1 |
| Comp. E | 57.7 | PA6,6/6,I/6 | 6 | 10 | 25 MDH-VS | | 13 | PPG-XM | 0.75 | 3.5 | 0.1 |
| Comp. F | 55.7 | PA6,6/6,I | 0 | 15 | 0 MDH-VS | 25 | 15 | NEG T-289DE | 0.75 | 3.5 | 0.1 |
| Comp. G | 55.7 | PA6,6/6,I | 0 | 15 | 0 MDH-VS | 25 | 15 | NEG T-289DE | 0.75 | 3.5 | 0.1 |
| Comp. H | 55.7 | PA6,6/6,I | 0 | 15 | 0 MDH-VS | 25 | 0 | — | — | — | — |
| Ex. 3 | 55.7 | PA6,6/6,I/6 | 6 | 10 | 25 MDH-VS | — | 15 | NEG T-289DE | 0.75 | 3.5 | 0.1 |
| Ex. 4 | 55.7 | PA6,6/6,I | 0 | 15 | 25 MDH-VS | — | 15 | NEG T-289DE | 0.75 | 3.5 | 0.1 |
| Ex. 5 | 55.65 | PA6,6/6,I | 0 | 15 | 25 MDH-VS | — | 15 | NEG T-289DE | 0.75 | 3.5 | 0.1 |

Semi-structural mineral for Comp. F is POLARITE 902A and Comp. G & H is POLARITE 702A
"MDH-VS" refers to vinylsilane coated magnesium hydroxide
"S-EED" refers to NYLOSTAB S-EED.

As shown in Table 3, the combination of the polyamides, type and size of glass fibers, and the amount of etchable filler in synergistic combinations improved the surface appearance of the respective injection-molded article. For example, each of Examples 3-5 exhibited an R-value greater than 6 and a DOI greater than 68.

In contrast, Comparative Examples A-E produced an injection-molded article with very poor surface appearance, e.g., an R-value less than 5 and a DOI less than 50. As for Comparative Examples F-H, the surface appearance was even worse and was often times too dull to measure. Although Comparative Examples F-H comprised glass fibers that had an average median diameter less than 10 microns, these Comparative Examples did not comprise any etchable filler. Additionally, Comparative Example A, which comprised a PA6,6/6 copolymer and did not include any PA6,I, exhibited poor surface appearance.

TABLE 3

|  | Long-wave | R-Value | DOI |
|---|---|---|---|
| Comp. A | <10 | 1 | <50 |
| Comp. B | <10 | 2 | <50 |
| Comp. C | <10 | 3 | <50 |
| Comp. D | <10 | 4 | <50 |
| Comp. E | 25.1 | 4.8 | <50 |
| Comp. F | Too Dull | Too Dull | Too Dull |
| Comp. G | 13.1 | 6.4 | Too Dull |
| Comp. H | Too Dull | Too Dull | Too Dull |
| Ex. 3 | 13.3 | 6.5 | 69 |
| Ex. 4 | 12.6 | 6.5 | 69 |
| Ex. 5 | 11.0 | 6.8 | 74 |

As shown in Table 4, Examples 3-5 also exhibited good mechanical properties. Examples 3-5 comprised a PA6/6,I copolymer having about 15 wt. % PA6,I and glass fibers having an average median diameter of about 6.5 microns. Examples 3-5 demonstrated a tensile strength greater than 125 MPa and a flex modulus greater than 8000 MPa.

Although Comparative Examples E-H achieved moderate/good physical properties, the surface appearance properties of the injection molded articles formed from these polyamide compositions was very poor. As shown in Tables 3 and 4, the injection molded articles formed from the polyamide compositions of Examples 3-5 surprisingly achieved moderate/good surface appearance properties while maintaining most mechanical properties desirable for injection-molded articles.

TABLE 4

|  | HDT (° C.) | Tensile Strength (MPa) | Tensile Modulus (MPa) | IZOD Impact (kJ/m$^2$) | Flex Strength (MPa) | Flex Modulus (MPa) | Density (g/cm$^3$) | Elongation (%) |
|---|---|---|---|---|---|---|---|---|
| Comp. A | 225 | 129 | 8,900 | — | 184 | 7,900 | — | 2 |
| Comp. B | 212 | 129 | 8,800 | — | 170 | 8,100 | — | 2 |
| Comp. C | 212 | 123 | 9,100 | — | 166 | 8,100 | — | — |
| Comp. D | 213 | 121 | 8,700 | — | 171 | 8,500 | — | 1.8 |
| Comp. E | 205 | 128 | 8,700 | 4.1 | 188 | 8,400 | 1.43 | 1.9 |
| Comp. F | 214 | 158 | 10,900 | 4.5 | 229 | 10,200 | 1.47 | 2.3 |
| Comp. G | 206 | 150 | 9,700 | 4.1 | 227 | 9,200 | 1.47 | 2.2 |
| Comp. H | 235 | 141 | 9,900 | 3.9 | 212 | 8,800 | 1.45 | 2 |
| Ex. 3 | 205 | 136 | 9,400 | 4.0 | 191 | 8,600 | 1.47 | 2.0 |
| Ex. 4 | 207 | 126 | 9,100 | 3.6 | 180 | 8,200 | 1.45 | 1.9 |
| Ex. 5 | 207 | 126 | 9,100 | 3.6 | 180 | 8,200 | 1.45 | 1.9 |

EMBODIMENTS

The following embodiments are contemplated. All combinations of features and embodiments are contemplated.

Embodiment 1

A polyamide composition comprising: from 40 wt. % to 80 wt. % of a polyamide; from 0.5 wt. % to 40 wt. % of an etchable filler; from 5 wt. % to 30 wt. % of glass fiber; optionally less than 40 wt. % of a semi-structural mineral; and optionally from 0.1 wt. % to 13 wt. % of additive.

Embodiment 2

An embodiment of embodiment 1, wherein the polyamide comprises PA-6, PA-6,6, PA4,6, PA-6,9, PA-6,10, PA-6,12, PA11, PA12, PA9,10, PA9,12, PA9,13, PA9,14, PA9,15, PA-6,16, PA9,36, PA10,10, PA10,12, PA10,13, PA10,14, PA12,10, PA12,12, PA12,13, PA12,14, PA-6,14, PA-6,13, PA-6,15, PA-6,16, PA-6,13, PAMXD,6, PA4T, PA5T, PA-6T, PA9T, PA10T, PA12T, PA4I, PA5I, PA-6I, PA10I, copolymers, terpolymers, and mixtures thereof.

Embodiment 3

An embodiment of any of embodiments 1 or 2, wherein the polyamide is a copolymer comprising PA-6,6 and PA-6I.

Embodiment 4

An embodiment of embodiment 3, wherein the copolymer comprises PA-6I ranging from 2 wt. % to 20 wt. %.

Embodiment 5

An embodiment of any of embodiments 1 or 2, wherein the polyamide is a terpolymer comprising PA-6,6, PA-6, and PA-6I.

Embodiment 6

An embodiment of embodiment 5, wherein the terpolymer comprises PA-6I ranging from 2 wt. % to 20 wt. % and PA-6 ranging from 2 wt. % to 20 wt. %.

Embodiment 7

An embodiment of any of the preceding embodiments, wherein the additive includes at least one of: inorganic stabilizers, organic stabilizers, flame retardants, lubricants, dyes, pigments, nucleating agents, metal flakes, impact modifiers, antistatic agents, conductivity additives, mold-release agents, optical brighteners, adhesion promoters, ageing inhibitors, antioxidants, antiozonants, light stabilizers, UV stabilizers, UV absorbers, UV blockers, inorganic heat stabilizers, organic heat stabilizers, processing aids, crystallization accelerators, crystallization retarders, flow aids, fibrous materials and particulate fillers.

Embodiment 8

An embodiment of embodiment 7, wherein the additive comprises from 1 wt. % to 10 wt. % of pigment, from 0.05 wt. % to 1 wt. % of lubricant, and/or from 0.25 wt. % to 2 wt. % of processing aid.

Embodiment 9

An embodiment of embodiments 7 or 8, wherein the pigment comprises a thermally stable nigrosine.

Embodiment 10

An embodiment of embodiments 7 or 8, wherein the lubricant comprises zinc stearate.

Embodiment 11

An embodiment of embodiments 7 or 8, wherein the processing aid comprises a substituted piperidine compound.

Embodiment 12

An embodiment of any of the preceding embodiments, wherein the etchable filler is coated with an organosilane coating.

Embodiment 13

An embodiment of embodiment 12, wherein the organosilane coating comprises vinylsilane.

Embodiment 14

An embodiment of embodiment 12, wherein the organosilane coating comprises aminosilane.

Embodiment 15

An embodiment of any of the preceding embodiments, wherein the etchable filler comprises one or more of magnesium hydroxide, calcium carbonate, and wollastonite.

Embodiment 16

An embodiment of any of the preceding embodiments, wherein the glass fibers have an average diameter less than 10 microns.

Embodiment 17

An embodiment of any of the preceding embodiments, wherein the glass fibers have an average diameter ranging from 4 microns to 8 microns.

Embodiment 18

An embodiment of any of the preceding embodiments, wherein the composition comprises a semi-structural mineral, wherein the semi-structural mineral comprises one or more of kaolin, mica, talc, and wollanstonite.

Embodiment 19

An embodiment of any of the preceding embodiments, wherein the composition has a distinctness of image greater than 65 as measured by Byk Gardner Wave Scan meter

Embodiment 20

An embodiment of any of the preceding embodiments, wherein the composition has a R-value greater than 7 as measured by Byk Gardner Wave Scan meter.

Embodiment 21

An embodiment of any of the preceding embodiments, wherein the composition has a density ranging from 1.25 $g/cm^3$ to 1.6 $g/cm^3$.

Embodiment 22

An embodiment of any of the preceding embodiments, wherein the composition has a melting point ranging from 220° C. to 260° C.

Embodiment 23

An embodiment of any of the preceding embodiments, wherein the polyamide is a copolymer comprising PA-6,6 and PA-6I, wherein the composition includes glass fibers having an average diameter ranging from 4 microns to 8 microns, wherein the composition has a density ranging from 1.3 $g/cm^3$ to 1.6 $g/cm^3$, wherein the composition has a distinctness of image greater than 65 as measured by Byk Gardner Wave Scan meter, wherein the composition has a R-value greater than 7 as measured by Byk Gardner Wave Scan meter.

Embodiment 24

An embodiment of any of the preceding embodiments, wherein the polyamide is a terpolymer comprising PA-6,6, PA-6I, and PA-6, wherein the composition includes glass fibers having an average diameter ranging from 4 microns to 8 microns, wherein the composition has a density ranging from 1.3 $g/cm^3$ to 1.6 $g/cm^3$, wherein the composition has a distinctness of image greater than 65 as measured by Byk Gardner Wave Scan meter, wherein the composition has a R-value greater than 7 as measured by Byk Gardner Wave Scan meter.

Embodiment 25

An injection-molded article formed from the composition of any one of the preceding embodiments.

Embodiment 26

An embodiment of embodiment 25, wherein the injection-molded article is plated with a metal comprising one or more of copper, manganese, tin, nickel, iron, chrome, zinc, gold, platinum, cobalt, phosphorus, aluminum, and alloys thereof.

Embodiment 27

An embodiment of embodiment 26, wherein the injection-molded article is plated with chrome.

Embodiment 28

A polyamide composition comprising: from 40 wt. % to 80 wt. % of a polyamide; from 0.5 wt. % to 40 wt. % of a silane-coated magnesium hydroxide; from 5 wt. % to 30 wt. % of glass fiber having a diameter less than 10 microns; optionally less than 40 wt. % of kaolin; and optionally from 0.1 wt. % to 13 wt. % of additive Embodiment 29

An embodiment of embodiment 28, wherein the additive includes at least one inorganic stabilizers, organic stabilizers, flame retardants, lubricants, dyes, pigments, nucleating agents, metal flakes, impact modifiers, antistatic agents, conductivity additives, mold-release agents, optical brighteners, adhesion promoters, ageing inhibitors, antioxidants, antiozonants, light stabilizers, UV stabilizers, UV absorbers, UV blockers, inorganic heat stabilizers, organic heat stabilizers, processing aids, crystallization accelerators, crystallization retarders, flow aids, fibrous materials and particulate fillers.

Embodiment 30

An embodiment of embodiments 28 or 29, wherein the additive comprises from 1 wt. % to 10 wt. % of nigrosine, from 0.05 wt. % to 1 wt. % of zinc stearate, from 0.25 wt. % to 2 wt. % of NYLOSTAB S-EED.

Embodiment 31

A process for preparing an injection-molded article comprising: providing a polyamide composition comprising: from 40 wt. % to 80 wt. % of a polyamide; from 0.5 wt. % to 40 wt. % of an etchable filler; from 5 wt. % to 30 wt. % of glass fiber; optionally less than 40 wt. % of a semi-structural mineral; and optionally from 0.1 wt. % to 13 wt. % of additive; heating the polyamide composition; filling a mold cavity with the heated polyamide composition; cooling the heated polyamide composition to form the injection-molded article.

Embodiment 32

An embodiment of embodiment 31, further comprising etching a surface of the injection-molded article with an etching solution.

Embodiment 33

An embodiment of any of embodiments 31 or 32, wherein the etching solution does not comprise any hexavalent chromium.

Embodiment 34

An embodiment of any of embodiments 31 to 33, further comprising plating the etched surface of the injection-molded article with a metal comprising one or more of copper, manganese, tin, nickel, iron, chrome, zinc, gold, platinum, cobalt, phosphorus, aluminum, and alloys thereof.

Embodiment 35

An embodiment of any of embodiments 31 to 34, wherein the etched surface of the injection-molded article is plated with chrome.

Embodiment 36

An embodiment of any of embodiments 31 to 35, wherein the additive includes at least one inorganic stabilizers, organic stabilizers, flame retardants, lubricants, dyes, pigments, nucleating agents, metal flakes, impact modifiers, antistatic agents, conductivity additives, mold-release agents, optical brighteners, adhesion promoters, ageing inhibitors, antioxidants, antiozonants, light stabilizers, UV stabilizers, UV absorbers, UV blockers, inorganic heat stabilizers, organic heat stabilizers, processing aids, crystallization accelerators, crystallization retarders, flow aids, fibrous materials and particulate fillers.

Embodiment 37

A polyamide composition comprising: from 40 wt. % to 80 wt. % of a polyamide; from 0.5 wt. % to 40 wt. % of an etchable filler; from 5 wt. % to 30 wt. % of glass fibers having an average diameter up to 10 microns; less than 40 wt. % of a semi-structural mineral; and from 0.1 wt. % to 13 wt. % of additive.

Embodiment 38

An embodiment of embodiment 37, wherein the polyamide comprises PA-6, PA-6,6, PA4,6, PA-6,9, PA-6,10, PA-6,12, PA11, PA12, PA9,10, PA9,12, PA9,13, PA9,14, PA9,15, PA-6,16, PA9,36, PA10,10, PA10,12, PA10,13, PA10,14, PA12,10, PA12,12, PA12,13, PA12,14, PA-6,14, PA-6,13, PA-6,15, PA-6,16, PA-6,13, PAMXD,6, PA4T, PA5T, PA-6T, PA9T, PA10T, PA12T, PA4I, PA5I, PA-6I, PA10I, copolymers, terpolymers, and mixtures thereof.

Embodiment 39

An embodiment of embodiment 37, wherein the polyamide is a copolymer comprising PA-6,6 and PA-6I, wherein the PA-6I ranges from 2 wt. % to 20 wt. %.

Embodiment 40

An embodiment of embodiment 37, wherein the polyamide is a terpolymer comprising PA-6,6, PA-6, and PA-6I, wherein the terpolymer comprises PA-6I ranging from 2 wt. % to 20 wt. % and PA-6 ranging from 2 wt. % to 20 wt. %.

Embodiment 41

An embodiment of embodiment 37, wherein the additive includes at least one of: inorganic stabilizers, organic stabilizers, flame retardants, lubricants, dyes, pigments, nucleating agents, metal flakes, impact modifiers, antistatic agents, conductivity additives, mold-release agents, optical brighteners, adhesion promoters, ageing inhibitors, antioxidants, antiozonants, light stabilizers, UV stabilizers, UV absorbers, UV blockers, inorganic heat stabilizers, organic heat stabilizers, processing aids, crystallization accelerators, crystallization retarders, flow aids, fibrous materials and particulate fillers.

Embodiment 42

An embodiment of embodiment 41, wherein the additive comprises from 1 wt. % to 10 wt. % of pigment, from 0.05 wt. % to 1 wt. % of lubricant, and/or from 0.25 wt. % to 2 wt. % of processing aid, wherein the pigment comprises a thermally stable nigrosine, wherein the lubricant comprises zinc stearate, and wherein the processing aid comprises a substituted piperidine compound.

Embodiment 43

An embodiment of embodiment 37, wherein the polyamide composition includes from 0.5 wt. % to 25 wt. % of the etchable filler, and wherein the etchable filler is coated with one or more of an organosilane coating, a vinylsilane coating, or an aminosilane coating.

Embodiment 44

An embodiment of embodiment 37, wherein the etchable filler comprises one or more of magnesium hydroxide, calcium carbonate, and wollastonite.

Embodiment 45

An embodiment of embodiment 37, wherein the glass fibers have an average diameter ranging from 4 microns to 8 microns.

Embodiment 46

An embodiment of embodiment 37, wherein the composition comprises a semi-structural mineral, wherein the semi-structural mineral comprises one or more of kaolin, mica, talc, and wollanstonite.

Embodiment 47

An embodiment of embodiment 37, wherein the composition has a distinctness of image greater than 50 as measured by Byk Gardner Wave Scan meter, and wherein the composition has a R-value greater than 5 as measured by Byk Gardner Wave Scan meter.

Embodiment 48

An embodiment of embodiment 37, wherein the composition has a density ranging from 1.25 g/cm$^3$ to 1.6 g/cm$^3$, and wherein the composition has a melting point ranging from 220° C. to 260° C.

Embodiment 49

An embodiment of embodiment 37, wherein the polyamide is a copolymer comprising PA-6,6 and PA-6I, wherein the composition includes glass fibers having an average diameter ranging from 4 microns to 8 microns, wherein the composition has a density ranging from 1.3 g/cm$^3$ to 1.6 g/cm$^3$, wherein the composition has a distinctness of image greater than 65 as measured by Byk Gardner Wave Scan meter, wherein the composition has a R-value greater than 7 as measured by Byk Gardner Wave Scan meter.

Embodiment 50

An embodiment of embodiment 37, wherein the polyamide is a terpolymer comprising PA-6,6, PA-6I, and PA-6, wherein the composition includes glass fibers having an average diameter ranging from 4 microns to 8 microns, wherein the composition has a density ranging from 1.3 g/cm$^3$ to 1.6 g/cm$^3$, wherein the composition has a distinctness of image greater than 65 as measured by Byk Gardner Wave Scan meter, wherein the composition has a R-value greater than 7 as measured by Byk Gardner Wave Scan meter.

Embodiment 51

An injection-molded article formed from the composition of embodiment 37, wherein the injection-molded article is plated with a metal comprising one or more of copper, manganese, tin, nickel, iron, chrome, zinc, gold, platinum, cobalt, phosphorus, aluminum, and alloys thereof.

Embodiment 52

A polyamide composition comprising: from 40 wt. % to 80 wt. % of a polyamide; from 0.5 wt. % to 40 wt. % of a silane-coated magnesium hydroxide; from 5 wt. % to 30 wt. % of glass fiber having an average diameter up to 10 microns; less than 40 wt. % of kaolin; and from 0.1 wt. % to 13 wt. % of additive.

Embodiment 53

An embodiment of embodiment 52, wherein the additive comprises from 0.5 wt. % to 10 wt. % of thermally stable nigrosine, from 0.05 wt. % to 1 wt. % of zinc stearate, and/or from 0.25 wt. % to 2 wt. % of substituted piperidine compound.

Embodiment 54

A process for preparing an injection-molded article comprising: providing a polyamide composition comprising: from 40 wt. % to 80 wt. % of a polyamide; from 0.5 wt. % to 40 wt. % of an etchable filler; from 5 wt. % to 30 wt. % of glass fiber having an average diameter up to 10 microns; less than 40 wt. % of a semi-structural mineral; and from 0.1 wt. % to 13 wt. % of additive; heating the polyamide composition; filling a mold cavity with the heated polyamide composition; cooling the heated polyamide composition to form the injection-molded article.

Embodiment 55

An embodiment of embodiment 54, further comprising etching a surface of the injection-molded article with an etching solution, wherein the etching solution does not comprise any hexavalent chromium.

Embodiment 56

An embodiment of embodiment 54, further comprising plating the etched surface of the injection-molded article with a metal comprising one or more of copper, manganese, tin, nickel, iron, chrome, zinc, gold, platinum, cobalt, phosphorus, aluminum, and alloys thereof.

While the disclosure has been described in detail, modifications within the spirit and scope of the disclosure will be readily apparent to those of skill in the art. In view of the foregoing discussion, relevant knowledge in the art and references discussed above in connection with the Background and Detailed Description, the disclosures of which are all incorporated herein by reference. In addition, it should be understood that embodiments of the disclosure and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art.

We claim:

1. A polyamide composition comprising:
   from 40 wt. % to 80 wt. % of a polyamide comprising a copolymer or terpolymer comprising 6,6, 6I, and 6 units;
   from 1 wt. % to 26 wt. % of a surface treated etchable filler comprising magnesium hydroxide treated with a silane;
   from 5 wt. % to 30 wt. % of glass fibers having an average diameter up to 9.5 microns;
   less than 40 wt. % of a semi-structural mineral; and
   from 0.1 wt. % to 13 wt. % of additive comprising inorganic stabilizers, organic stabilizers, flame retardants, lubricants, dyes, pigments, nucleating agents, metal flakes, impact modifiers, antistatic agents, conductivity additives, mold-release agents, optical brighteners, adhesion promoters, ageing inhibitors, antioxidants, antiozonants, light stabilizers, UV stabilizers, UV absorbers, UV blockers, inorganic heat stabilizers, organic heat stabilizers, processing aids, crystallization accelerators, crystallization retarders, flow aids, or particulate fillers, or combinations thereof.

2. The composition of claim 1, wherein the polyamide is a copolymer comprising PA-6,6 and PA-6I, wherein the PA-6I ranges from 2 wt. % to 20 wt. %.

3. The composition of claim 1, wherein the polyamide is a terpolymer comprising PA-6,6, PA-6, and PA-6I, wherein the terpolymer comprises PA-6I ranging from 2 wt. % to 20 wt. % and PA-6 ranging from 2 wt. % to 20 wt. %.

4. The composition of claim 1, wherein the additive comprises from 1 wt. % to 10 wt. % of pigment, from 0.05 wt. % to 1 wt. % of lubricant, and/or from 0.25 wt. % to 2 wt. % of processing aid, wherein the pigment comprises a thermally stable nigrosine, wherein the lubricant comprises zinc stearate, and wherein the processing aid comprises a substituted piperidine compound.

5. The composition of claim 1, wherein the glass fibers have an average diameter ranging from 4 microns to 8 microns.

6. The composition of claim 1, wherein the composition comprises a semi-structural mineral, wherein the semi-structural mineral comprises one or more of kaolin, mica, talc, and wollastonite.

7. The composition of claim 1, wherein the composition has a distinctness of image greater than 50 as measured by Byk Gardner Wave Scan meter, and wherein the composition has a R-value greater than 5 as measured by Byk Gardner Wave Scan meter.

8. The composition of claim 1, wherein the composition has a density ranging from 1.25 g/cm$^3$ to 1.6 g/cm$^3$, and wherein the composition has a melting point ranging from 220° C. to 260° C.

9. The composition of claim 1, wherein the polyamide is a copolymer comprising PA-6,6 and PA-6I, wherein the composition includes glass fibers having an average diameter ranging from 4 microns to 8 microns, wherein the composition has a density ranging from 1.3 g/cm$^3$ to 1.6 g/cm$^3$, wherein the composition has a distinctness of image greater than 65 as measured by Byk Gardner Wave Scan meter, wherein the composition has a R-value greater than 7 as measured by Byk Gardner Wave Scan meter.

10. The composition of claim 1, wherein the polyamide is a terpolymer comprising PA-6,6, PA-6I, and PA-6, wherein the composition includes glass fibers having an average diameter ranging from 4 microns to 8 microns, wherein the composition has a density ranging from 1.3 g/cm$^3$ to 1.6 g/cm$^3$, wherein the composition has a distinctness of image greater than 65 as measured by Byk Gardner Wave Scan meter, wherein the composition has a R-value greater than 7 as measured by Byk Gardner Wave Scan meter.

11. An injection-molded article formed from the composition of claim 1, wherein the injection-molded article is plated with a metal comprising one or more of copper, manganese, tin, nickel, iron, chrome, zinc, gold, platinum, cobalt, phosphorus, aluminum, and alloys thereof.

12. A polyamide composition comprising:
    from 40 wt. % to 80 wt. % of a polyamide comprising a copolymer or terpolymer comprising 6,6, 6I, and 6 units;
    from 1 wt. % to 26 wt. % of a silane-coated magnesium hydroxide;
    from 5 wt. % to 30 wt. % of glass fiber having an average diameter up to 9.5 microns;
    less than 40 wt. % of kaolin; and
    from 0.1 wt. % to 13 wt. % of additive comprising inorganic stabilizers, organic stabilizers, flame retardants, lubricants, dyes, pigments, nucleating agents, metal flakes, impact modifiers, antistatic agents, conductivity additives, mold-release agents, optical brighteners, adhesion promoters, ageing inhibitors, antioxidants, antiozonants, light stabilizers, UV stabilizers, UV absorbers, UV blockers, inorganic heat stabilizers, organic heat stabilizers, processing aids, crystallization accelerators, crystallization retarders, flow aids, or particulate fillers, or combinations thereof.

13. The composition of claim 12, wherein the additive comprises from 0.5 wt. % to 10 wt. % of thermally stable nigrosine, from 0.05 wt. % to 1 wt. % of zinc stearate, and/or from 0.25 wt. % to 2 wt. % of substituted piperidine compound.

14. A process for preparing an injection-molded article comprising:
    providing a polyamide composition comprising:
      from 40 wt. % to 80 wt. % of a polyamide comprising a copolymer or terpolymer comprising 6,6, 6I, and 6 units;
      from 1 wt. % to 26 wt. % of a surface treated etchable filler comprising magnesium hydroxide treated with a silane;
      from 5 wt. % to 30 wt. % of glass fiber having an average diameter up to 9.5 microns;
      less than 40 wt. % of a semi-structural mineral; and
      from 0.1 wt. % to 13 wt. % of additive comprising inorganic stabilizers, organic stabilizers, flame retardants, lubricants, dyes, pigments, nucleating agents, metal flakes, impact modifiers, antistatic agents, conductivity additives, mold-release agents, optical brighteners, adhesion promoters, ageing inhibitors, antioxidants, antiozonants, light stabilizers, UV stabilizers, UV absorbers, UV blockers, inorganic heat stabilizers, organic heat stabilizers, processing aids, crystallization accelerators, crystallization retarders, flow aids, or particulate fillers, or combinations thereof;

heating the polyamide composition;

filling a mold cavity with the heated polyamide composition;

cooling the heated polyamide composition to form the injection-molded article.

15. The process of claim 14, further comprising etching a surface of the injection-molded article with an etching solution, wherein the etching solution does not comprise any hexavalent chromium.

16. The process of claim 14, further comprising plating the etched surface of the injection-molded article with a metal comprising one or more of copper, manganese, tin, nickel, iron, chrome, zinc, gold, platinum, cobalt, phosphorus, aluminum, and alloys thereof.

* * * * *